(12) United States Patent
Sorrells et al.

(10) Patent No.: US 9,719,030 B2
(45) Date of Patent: Aug. 1, 2017

(54) EPOXIDE-BASED HYDROGEN SULFIDE SCAVENGERS

(71) Applicant: Ecolab USA Inc., Eagan, MN (US)

(72) Inventors: Jennifer L. Sorrells, Houston, TX (US); Nestor U. Soriano, Jr., Missouri City, TX (US)

(73) Assignee: Ecolab USA Inc., St. Paul, MN (US)

( * ) Notice: Subject to any disclaimer, the term of this patent is extended or adjusted under 35 U.S.C. 154(b) by 495 days.

(21) Appl. No.: 14/314,683

(22) Filed: Jun. 25, 2014

(65) Prior Publication Data

US 2015/0001132 A1 Jan. 1, 2015

Related U.S. Application Data

(60) Provisional application No. 61/840,338, filed on Jun. 27, 2013.

(51) Int. Cl.

| | |
|---|---|
| *C10G 29/00* | (2006.01) |
| *C10G 29/20* | (2006.01) |
| *C10G 29/22* | (2006.01) |
| *B01D 53/52* | (2006.01) |
| *B01D 53/44* | (2006.01) |
| *B01D 53/48* | (2006.01) |
| *C10L 3/10* | (2006.01) |

(52) U.S. Cl.
CPC .............. *C10G 29/20* (2013.01); *B01D 53/44* (2013.01); *B01D 53/48* (2013.01); *B01D 53/52* (2013.01); *C10G 29/00* (2013.01); *C10G 29/22* (2013.01); *C10L 3/103* (2013.01); *B01D 2252/202* (2013.01); *B01D 2252/606* (2013.01); *B01D 2252/608* (2013.01); *B01D 2252/61* (2013.01); *B01D 2256/24* (2013.01); *B01D 2257/304* (2013.01); *B01D 2257/306* (2013.01); *B01D 2258/05* (2013.01); *C10G 2300/1033* (2013.01); *C10L 2230/02* (2013.01); *C10L 2290/141* (2013.01)

(58) Field of Classification Search
CPC ......... C10G 29/00; C10G 29/20; C10G 29/22
See application file for complete search history.

(56) References Cited

U.S. PATENT DOCUMENTS

| | | | |
|---|---|---|---|
| 2,862,804 A * | 12/1958 | Petty | C10G 29/20 208/204 |
| 4,421,733 A | 12/1983 | Blytas | |
| 4,569,766 A | 2/1986 | Kool et al. | |
| 4,680,127 A | 7/1987 | Edmondson | |
| 5,128,049 A | 7/1992 | Gatlin | |
| 5,225,103 A | 7/1993 | Hoffmann et al. | |
| 5,552,060 A * | 9/1996 | Roof | C02F 1/54 208/189 |
| 5,674,377 A | 10/1997 | Sullivan, III et al. | |
| 6,242,618 B1 | 6/2001 | Forester et al. | |
| 6,887,447 B2 | 5/2005 | Schield et al. | |
| 7,078,005 B2 | 7/2006 | Smith et al. | |
| 7,216,710 B2 | 5/2007 | Welton et al. | |
| 8,172,952 B2 | 5/2012 | Wanner et al. | |
| 2004/0086443 A1 | 5/2004 | Schield et al. | |
| 2004/0096382 A1 | 5/2004 | Smith et al. | |
| 2007/0142244 A1 | 6/2007 | Schield | |
| 2007/0284288 A1 | 12/2007 | Gatlin | |
| 2011/0315921 A1 | 12/2011 | Ramachandran et al. | |
| 2012/0012507 A1 | 1/2012 | Compton et al. | |
| 2012/0152857 A1 | 6/2012 | Yang et al. | |

FOREIGN PATENT DOCUMENTS

| | | |
|---|---|---|
| EP | 0 279 667 A2 | 8/1988 |
| EP | 0 882 778 A2 | 12/1998 |
| EP | 1 363 985 B1 | 8/2007 |
| EP | 2 465 975 A1 | 6/2012 |
| WO | 02/051968 A1 | 7/2002 |
| WO | 2012/128935 A2 | 9/2012 |

OTHER PUBLICATIONS

Arkema, Inc., "Mercaptans and Derivative Chemistry," Organic Chemicals, Product Information, 2001, 8 pages.
International Search Report and Written Opinion issued for PCT/US2014/044114 dated Oct. 15, 2014, 9 pages.
Kelland, M. A., "Hydrogen Sulfide Scavengers," Production Chemicals for the Oil and Gas Industry, Chapter 15, 2009, pp. 363-376.
Kissel, C. L., et al., "Factors Contributing to the Ability of Acrolein to Scavenge Corrosive Hydrogen Sulfide," Society of Petroleum Engineers Journal, Oct. 1985, pp. 647-655.

* cited by examiner

*Primary Examiner* — Renee Robinson
(74) *Attorney, Agent, or Firm* — Senniger Powers LLP

(57) ABSTRACT

Disclosed herein are scavenging compounds and compositions useful in applications relating to the production, transportation, storage, and separation of crude oil and natural gas. Also disclosed herein are methods of using the compounds and compositions as scavengers, particularly in applications relating to the production, transportation, storage, and separation of crude oil and natural gas.

20 Claims, 3 Drawing Sheets

EPOXIDE-BASED HYDROGEN SULFIDE SCAVENGERS

CROSS-REFERENCE TO RELATED APPLICATIONS

This application claims the benefit of U.S. Provisional Patent Application Ser. No. 61/840,338, filed Jun. 27, 2013, the entirety of which is herein incorporated by reference.

FIELD OF THE INVENTION

The present disclosure relates generally to scavengers of sulfur-based species, and more particularly to epoxide compounds and compositions as scavengers of hydrogen sulfide and/or mercaptans.

BACKGROUND OF THE INVENTION

The removal of sulfur-based species from liquid or gaseous hydrocarbon streams is a problem that has long challenged many industries. Hydrogen sulfide is a huge problem in the oil industry, particularly in the drilling, production, transportation, storage, and processing of crude oil, as well as waste water associated with crude oil. The same problems exist in the natural gas industry.

The presence of sulfur-containing compounds such as hydrogen sulfide can result in the deposition of sulfur containing salts, which can cause plugging and corrosion of transmission pipes, valves, regulators and other process equipment. Even flared natural gas needs to be treated to avoid acid rain generation due to $SO_x$ formation. Also, in the manufactured gas industry or coke making industry, coal-gas emissions containing unacceptable levels of hydrogen sulfide are commonly produced from destructive distillation of bituminous coal.

One of the challenges with refining crude oil is that the presence of mercaptans and hydrogen sulfide cannot be dealt with through traditional distillation. In fact, distillation can exacerbate the problem, as mercaptans and hydrogen sulfide tend to contaminate many different distillation cuts, rather than being removed at particular boiling points. Traditional methods of removal from the refinery streams include merox units and hydrotreating. However, merox units are not completely effective and often cause more problems, including caustic contamination of the refinery stream. Additionally, not all refinery streams are hydrotreated and therefore additional methods of dealing with mercaptans and hydrogen sulfide are necessary.

Despite the availability of scavengers for use in the oil and gas industry, there still exists a need for improved compounds, compositions and methods to abate these sulfur compounds throughout the refining process.

SUMMARY OF THE INVENTION

In one aspect, disclosed is a method of sweetening a fluid or gas, comprising treating the fluid or gas with an effective amount of a composition comprising a compound of formula (I)

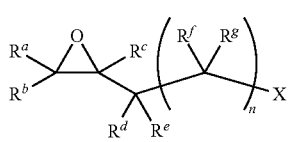

(I)

wherein,

X is selected from the group consisting of —OH, —SH, and —NHR$^3$;

R$^3$ is selected from the group consisting of hydrogen, alkyl, alkenyl, alkynyl, aryl, heteroaryl, heterocycle, cycloalkyl, and —C(O)R$^7$;

R$^7$ is selected from the group consisting of —OR$^{15}$, —SR$^{16}$, —NR$^{17}$R$^{18}$, hydrogen, alkyl, alkenyl, alkynyl, aryl, heteroaryl, heterocycle, and cycloalkyl;

R$^{15}$, R$^{16}$, R$^{17}$, and R$^{18}$ are each independently selected from the group consisting of hydrogen, alkyl, alkenyl, alkynyl, aryl, heteroaryl, heterocycle, and cycloalkyl;

R$^a$, R$^b$, R$^c$, R$^d$, R$^e$, R$^f$, and R$^g$ are each independently selected from the group consisting of hydrogen, halogen, alkyl, alkenyl, alkynyl, aryl, heteroaryl, heterocycle, and cycloalkyl; or R$^d$ and R$^f$ together with the carbon atoms to which they are attached form an aryl or a heteroaryl, provided that R$^e$ and R$^g$ are absent when R$^d$ and R$^f$ together with the carbon atoms to which they are attached form an aryl or a heteroaryl; and n is 0 or 1;

wherein said alkyl, alkenyl, alkynyl, aryl, heteroaryl, heterocycle, and cycloalkyl are each independently, at each occurrence, substituted or unsubstituted with one or more suitable substituents.

X can be —OH.

R$^a$, R$^b$, R$^c$, R$^d$, R$^e$, R$^f$, and R$^g$ can each independently be selected from the group consisting of hydrogen, substituted or unsubstituted C$_1$-C$_{10}$-alkyl, fluoro, bromo, and iodo.

Compounds of Formula I can have substituents where X is —OH; R$^a$ is hydrogen or substituted or unsubstituted alkyl; R$^b$ is hydrogen; R$^c$ is hydrogen; R$^d$ is hydrogen or substituted or unsubstituted alkyl; R$^e$ is hydrogen; and n is 0.

Compounds of Formula I can have substituents where X is —OH; R$^a$ is hydrogen or unsubstituted C$_1$-C$_{10}$-alkyl; R$^b$ is hydrogen; R$^c$ is hydrogen; R$^d$ is hydrogen or unsubstituted C$_1$-C$_{10}$-alkyl; R$^e$ is hydrogen; and n is 0.

Compounds of Formula I can have substituents where X is —OH; R$^a$ is hydrogen or substituted or unsubstituted alkyl; R$^b$ is hydrogen; R$^c$ is hydrogen; R$^d$ is hydrogen; R$^e$ is hydrogen; R$^f$ is hydrogen or substituted or unsubstituted alkyl; R$^g$ is hydrogen; and n is 1.

Compounds of Formula I can have substituents where X is —OH; R$^a$ is hydrogen or unsubstituted C$_1$-C$_{10}$-alkyl; R$^b$ is hydrogen; R$^c$ is hydrogen; R$^d$ is hydrogen; R$^e$ is hydrogen; R$^f$ is hydrogen or unsubstituted C$_1$-C$_{10}$-alkyl; R$^g$ is hydrogen; and n is 1.

Compounds of Formula I can have substituents where R$^a$, R$^b$, and R$^c$ are each independently selected from the group consisting of hydrogen, alkyl, alkenyl, alkynyl, aryl, heteroaryl, heterocycle, and cycloalkyl; R$^d$ and R$^f$ together with the carbon atoms to which they are attached form an aryl group; R$^e$ is absent; R$^g$ is absent; and n is 1.

Compounds of Formula I can have substituents where X is —OH; R$^a$ is hydrogen; R$^b$ is hydrogen; R$^c$ is hydrogen; R$^d$ and R$^f$ together with the carbon atoms to which they are attached form a phenyl group, optionally having one to four suitable substituents in addition to the —OH; R$^e$ is absent; R$^g$ is absent; and n is 1.

Compounds of Formula I can have substituents where X is —OH; R$^a$ is —(CH$_2$)$_7$—C(O)OR$^x$, wherein R$^x$ is selected from the group consisting of hydrogen, alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently, at each occurrence, substituted or unsubstituted with one or more suitable substituents; $R^b$ is hydrogen; $R^c$ is hydrogen; $R^d$ is hydrogen; $R^e$ is hydrogen; $R^f$ is —(CH₂)₅CH₃; $R^g$ is hydrogen; and n is 1.

Compounds of Formula I can have substituents where X is —OH; $R^a$ is —(CH₂)₇—C(O)OR$^x$, wherein R$^x$ is

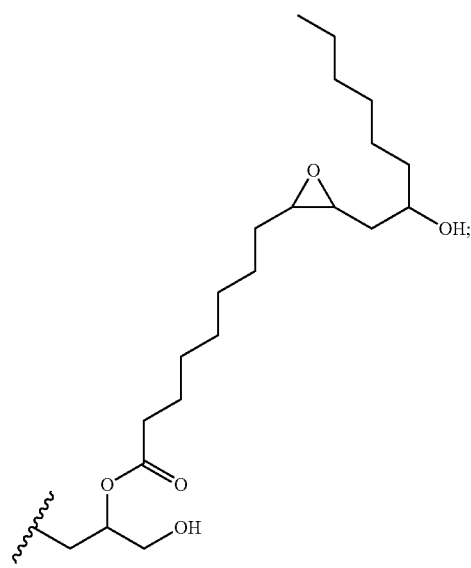 [SMILES: *CC(CO)OC(=O)CCCCCCCC1OC1CC(O)CCCCCC]

$R^b$ is hydrogen; $R^c$ is hydrogen; $R^d$ is hydrogen; $R^e$ is hydrogen; $R^f$ is —(CH₂)₅CH₃; $R^g$ is hydrogen; and n is 1.

Compounds of Formula I can have substituents where X is —OH; $R^a$ is —(CH₂)₇—C(O)OR$^x$, wherein R$^x$ is

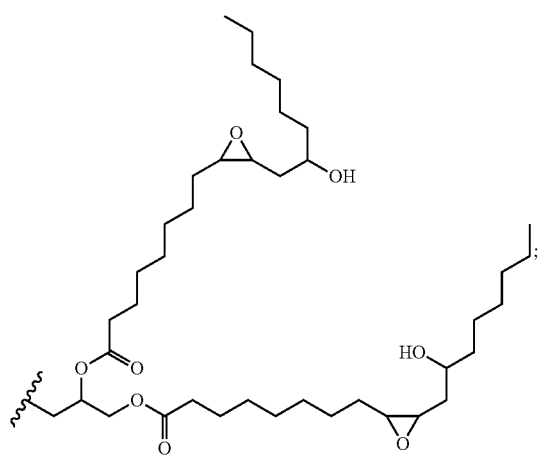 [SMILES: *CC(COC(=O)CCCCCCCC1OC1CC(O)CCCCCC)OC(=O)CCCCCCCC1OC1CC(O)CCCCCC]

$R^b$ is hydrogen; $R^c$ is hydrogen; $R^d$ is hydrogen; $R^e$ is hydrogen; $R^f$ is —(CH₂)₅CH₃; $R^g$ is hydrogen; and n is 1.

Compounds of Formula I can have substituents where the compound of formula (I) is selected from the group consisting of:

(i)
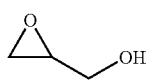

(ii)
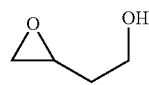

(iii)
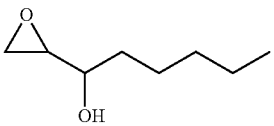

(iv)
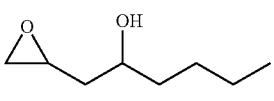

(v)
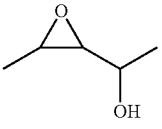

(vi)
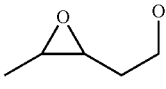

(vii)
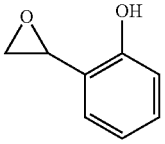

(viii)
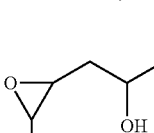

(ix)

-continued

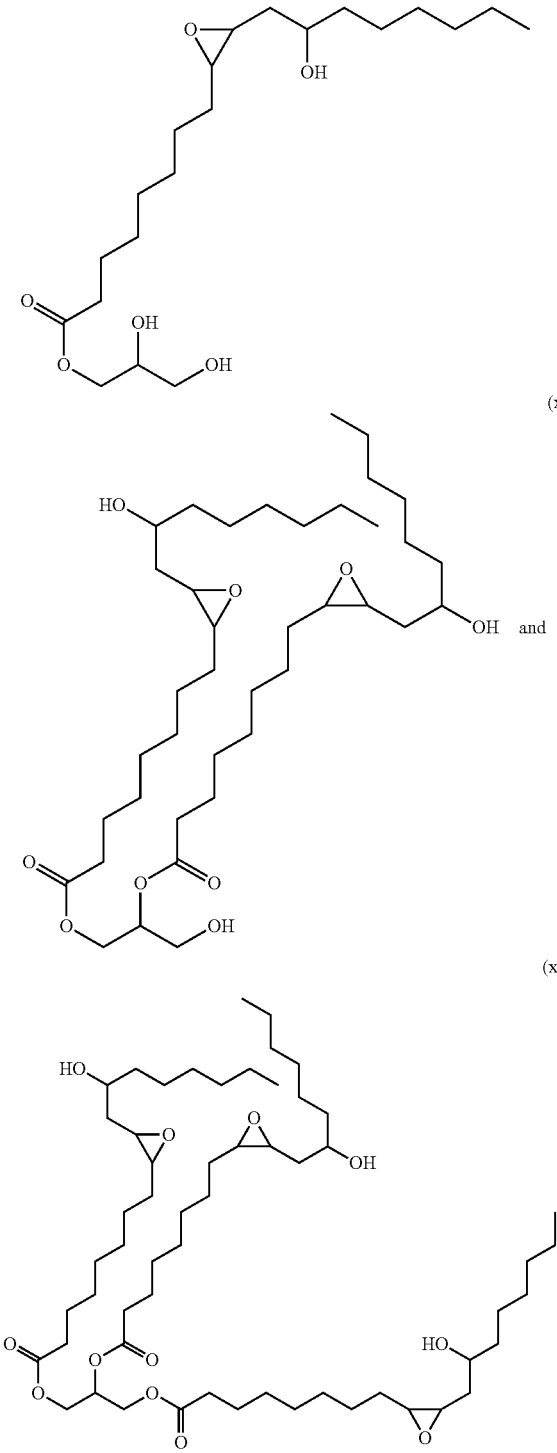

The composition containing one or more compounds of Formula I can further include one or more additional components, each component independently selected from the group consisting of asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, and solvents.

The composition can also include at least one solvent. The solvent can be an alcohol, a hydrocarbon, a ketone, an ether, an aromatic, an amide, a nitrile, a sulfoxide, an ester, an aqueous system, or a combination thereof.

The composition can also comprise a surfactant. The surfactant can be a cocodimethylamine oxide surfactant.

The composition can include about 50 wt % of one or more compounds of Formula I, 0-20 wt % cocodimethylamine oxide, and 30-50 wt % methyl carbitol.

The composition can include about 50 wt % of one or more compounds of formula (I), about 3 wt % cocodimethylamine oxide, and about 47 wt % methyl carbitol.

The composition comprising compounds of Formula I scavenges hydrogen sulfide and/or mercaptans from the fluid or gas.

The fluid or gas can be produced or used in the production, transportation, storage, and/or separation of crude oil or natural gas. The fluid or gas can be produced or used in a coal-fired process, a waste-water process, a farm, a slaughter house, a land-fill, a municipality waste-water plant, a coking coal process, or a biofuel process.

The composition can comprise a mixture of compounds of Formula I.

In another aspect, disclosed is a method of sweetening a fluid or gas, comprising treating the fluid or gas with an effective amount of a composition comprising one or more compounds of formula (II),

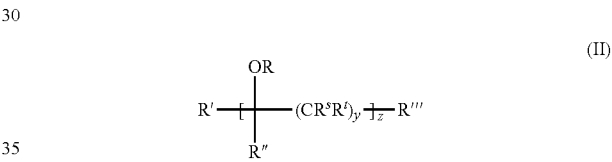

wherein

R is independently, at each occurrence, selected from the group consisting of hydrogen and a moiety comprising an α- or β-functionalized epoxide, said α- or β-functionalization selected from the group consisting of —OH, —SH, and —NHR$^{23}$, wherein at least one R group is a moiety comprising said α- or β-functionalized epoxide;

R$^{23}$ is selected from the group consisting of hydrogen, alkyl, alkenyl, alkynyl, aryl, heteroaryl, heterocycle, cycloalkyl, and —C(O)R$^{27}$;

R$^{27}$ is selected from the group consisting of —OR$^{35}$, —SR$^{36}$, —NR$^{37}$R$^{38}$, hydrogen, alkyl, alkenyl, alkynyl, aryl, heteroaryl, heterocycle, and cycloalkyl;

R$^{35}$, R$^{36}$, R$^{37}$, and R$^{38}$ are each independently selected from the group consisting of hydrogen, alkyl, alkenyl, alkynyl, aryl, heteroaryl, heterocycle, and cycloalkyl;

R', R'', R''', R$^s$, and R$^t$ are each independently, at each occurrence, selected from the group consisting of hydrogen, halogen, alkyl, alkenyl, alkynyl, aryl, heteroaryl, heterocycle, and cycloalkyl;

y is independently, at each occurrence, an integer selected from 0 to 6; and z is an integer selected from 1 to 20;

wherein said alkyl, alkenyl, alkynyl, aryl, heteroaryl, heterocycle, and cycloalkyl are each independently, at each occurrence, substituted or unsubstituted with one or more suitable substituents.

Compounds of Formula II can have substituents where R is independently, at each occurrence, selected from the group consisting of hydrogen and a moiety of formula:

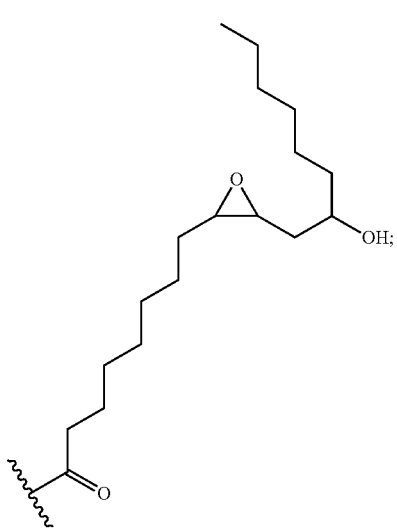 [SMILES: *C(=O)CCCCCCCC1OC1CC(O)CCCCCC]

R', R'', and R''' are each hydrogen;
y is 0 at each occurrence; and
z is 3.

The composition can further include one or more additional components, each component independently selected from the group consisting of asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, and solvents.

The composition can also include at least one solvent. The solvent can be an alcohol, a hydrocarbon, a ketone, an ether, an aromatic, an amide, a nitrile, a sulfoxide, an ester, an aqueous system, or a combination thereof.

The composition can further comprise a surfactant. The surfactant can be a cocodimethylamine oxide surfactant.

The composition includes about 50 wt % of one or more compounds of Formula II, 0-20 wt % cocodimethylamine oxide, and 30-50 wt % methyl carbitol. Preferably, the composition includes about 50 wt % of one or more compounds of formula (II), about 3 wt % cocodimethylamine oxide, and about 47 wt % methyl carbitol.

The composition comprising compounds of Formula II scavenges hydrogen sulfide and/or mercaptans from the fluid or gas.

The fluid or gas can be produced or used in the production, transportation, storage, and/or separation of crude oil or natural gas. The fluid or gas can be produced or used in a coal-fired process, a waste-water process, a farm, a slaughter house, a land-fill, a municipality waste-water plant, a coking coal process, or a biofuel process.

The composition can comprise a mixture of compounds of Formula II.

The compounds, compositions, methods and processes are further described herein.

DETAILED DESCRIPTION

Figure 1:
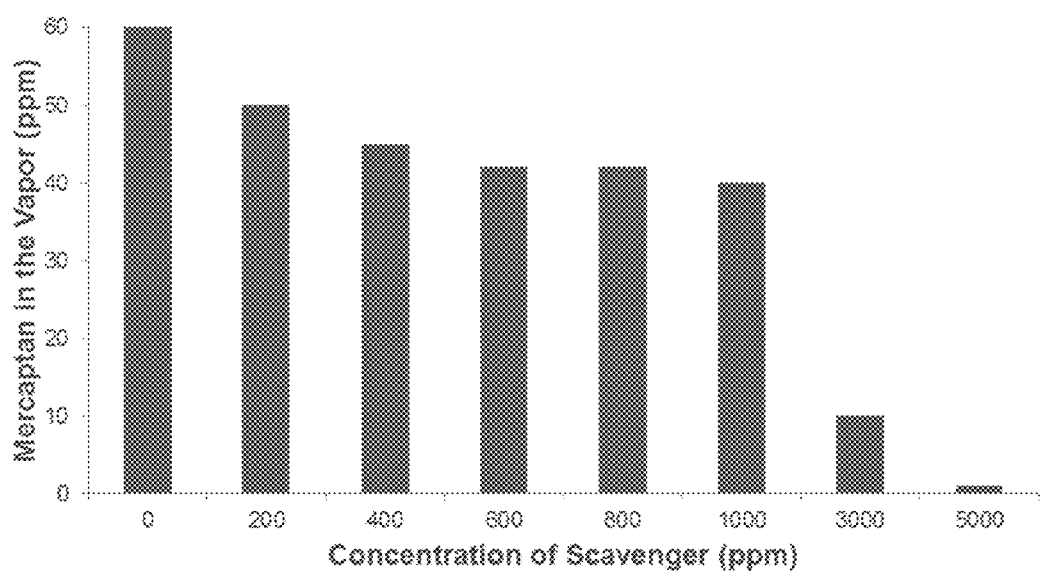
FIG. 1 depicts scavenging of 1-propyl mercaptan using 3-hydroxypropylene oxide.

Disclosed herein are hydrogen sulfide and/or mercaptan scavenging compounds and compositions, methods of using said compounds and compositions, and processes for their preparation. The compounds and compositions are particularly useful in the removal of hydrogen sulfide and/or mercaptans from crude oil based, natural gas based, and coal based products, processes, and refinery streams. The compounds and compositions are applicable to both upstream and downstream processes. The scavenging compounds and compositions, optionally blended with one or more solvents and/or one or more surfactants (e.g., cocodimethyl amine oxide surfactant), are useful in a wide range of climates and under a wide range of process conditions.

As one advantage, the compounds and compositions disclosed herein are able to remove hydrogen sulfide and/or mercaptans from fuels (e.g., finished fuels) without hazing or clouding of the fuel. Other advantages of the disclosed compounds and compositions include that the compounds and compositions are non-nitrogen based; pass all standard American Society for Testing and Materials (ASTM) and Universal Oil Products (UOP) tests for mercaptans; are non-aqueous based; and are small molecules with low volatility. Additionally, the scavenged product diols possess low volatility, easing sequestration and removal from treated fluids and gases.

Without being bound by theory, it is believed the unexpected superior scavenging ability of the disclosed α- or β-functionalized epoxide compounds results from intramolecular acid catalysis of the epoxide by the adjacent α- or β-functionality. The internal acid catalysis weakens the epoxide C—O bond and promotes nucleophilic addition of mercaptans and/or hydrogen sulfide to the epoxide. It is believed the α- or β-functionalization activates the epoxide for nucleophilic addition by serving as a hydrogen bond donor.

1. DEFINITION OF TERMS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

The term "suitable substituent," as used herein, is intended to mean a chemically acceptable functional group, preferably a moiety that does not negate the scavenging activity of the inventive compounds. Such suitable substituents include, but are not limited to halo groups, perfluoroalkyl groups, perfluoroalkoxy groups, alkyl groups, alkenyl groups, alkynyl groups, hydroxy groups, oxo groups, mercapto groups, alkylthio groups, alkoxy groups, aryl or heteroaryl groups, aryloxy or heteroaryloxy groups, aralkyl or heteroaralkyl groups, aralkoxy or heteroaralkoxy groups, HO—(C=O)— groups, heterocyclic groups, cycloalkyl groups, amino groups, alkyl- and dialkylamino groups, carbamoyl groups, alkylcarbonyl groups, alkoxycarbonyl groups, alkylaminocarbonyl groups, dialkylamino carbonyl groups, arylcarbonyl groups, aryloxycarbonyl groups, alkylsulfonyl groups, and arylsulfonyl groups. Those skilled in the art will appreciate that many substituents can be substituted by additional substituents.

The term "alkyl," as used herein, refers to a linear or branched hydrocarbon radical, preferably having 1 to 32 carbon atoms (i.e., 1, 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons). Alkyl groups include, but are not limited to, methyl, ethyl, n-propyl, isopropyl, n-butyl, iso-butyl, secondary-butyl, and tertiary-butyl. Alkyl groups can be unsubstituted or substituted by one or more suitable substituents, as defined above.

The term "alkenyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon double bonds. Alkenyl groups include, but are not limited to, ethenyl, 1-propenyl, 2-propenyl(allyl), iso-propenyl, 2-methyl-1-propenyl, 1-butenyl, and 2-butenyl. Alkenyl groups can be unsubstituted or substituted by one or more suitable substituents, as defined above.

The term "alkynyl," as used herein, refers to a straight or branched hydrocarbon radical, preferably having 2, 3, 4, 5, 6, 7, 8, 9, 10, 11, 12, 13, 14, 15, 16, 17, 18, 19, 20, 21, 22, 23, 24, 25, 26, 27, 28, 39, 30, 31, or 32 carbons, and having one or more carbon-carbon triple bonds. Alkynyl groups include, but are not limited to, ethynyl, propynyl, and butynyl. Alkynyl groups can be unsubstituted or substituted by one or more suitable substituents, as defined above.

The term "alkoxy," as used herein, refers to an alkyl group, as defined herein, appended to the parent molecular moiety through an oxygen atom.

The term "aryl," as used herein, means monocyclic, bicyclic, or tricyclic aromatic radicals such as phenyl, naphthyl, tetrahydronaphthyl, indanyl and the like; optionally substituted by one or more suitable substituents, preferably 1 to 5 suitable substituents, as defined above.

The term "carbonyl," "(C=O)," or "—C(O)—" (as used in phrases such as alkylcarbonyl, alkyl —(C=O)— or alkoxycarbonyl) refers to the joinder of the >C=O moiety to a second moiety such as an alkyl or amino group (i.e. an amido group). Alkoxycarbonylamino (i.e. alkoxy(C=O)—NH—) refers to an alkyl carbamate group. The carbonyl group is also equivalently defined herein as (C=O). Alkylcarbonylamino refers to groups such as acetamide.

The term "cycloalkyl," as used herein, refers to a mono, bicyclic or tricyclic carbocyclic radical (e.g., cyclopropyl, cyclobutyl, cyclopentyl, cyclohexyl, cycloheptyl, cyclooctyl, cyclononyl, cyclopentenyl, cyclohexenyl, bicyclo[2.2.1] heptanyl, bicyclo[3.2.1]octanyl and bicyclo[5.2.0]nonanyl, etc.); optionally containing 1 or 2 double bonds. Cycloalkyl groups can be unsubstituted or substituted by one or more suitable substituents, preferably 1 to 5 suitable substituents, as defined above.

The term "halo" or "halogen," as used herein, refers to a fluoro, chloro, bromo or iodo radical.

The term "heteroaryl," as used herein, refers to a monocyclic, bicyclic, or tricyclic aromatic heterocyclic group containing one or more heteroatoms selected from O, S and N in the ring(s). Heteroaryl groups include, but are not limited to, pyridyl, pyrazinyl, pyrimidinyl, pyridazinyl, thienyl, furyl, imidazolyl, pyrrolyl, oxazolyl (e.g., 1,3-oxazolyl, 1,2-oxazolyl), thiazolyl (e.g., 1,2-thiazolyl, 1,3-thiazolyl), pyrazolyl, tetrazolyl, triazolyl (e.g., 1,2,3-triazolyl, 1,2,4-triazolyl), oxadiazolyl (e.g., 1,2,3-oxadiazolyl), thiadiazolyl (e.g., 1,3,4-thiadiazolyl), quinolyl, isoquinolyl, benzothienyl, benzofuryl, and indolyl. Heteroaryl groups can be unsubstituted or substituted by one or more suitable substituents, preferably 1 to 5 suitable substituents, as defined above.

The term "heterocycle," as used herein, refers to a monocyclic, bicyclic, or tricyclic group containing 1 to 4 heteroatoms selected from N, O, $S(O)_n$, $P(O)_n$, $PR^z$, NH or $NR^z$, wherein $R^z$ is a suitable substituent. Heterocyclic groups optionally contain 1 or 2 double bonds. Heterocyclic groups include, but are not limited to, azetidinyl, tetrahydrofuranyl, imidazolidinyl, pyrrolidinyl, piperidinyl, piperazinyl, oxazolidinyl, thiazolidinyl, pyrazolidinyl, thiomorpholinyl, tetrahydrothiazinyl, tetrahydro-thiadiazinyl, morpholinyl, oxetanyl, tetrahydrodiazinyl, oxazinyl, oxathiazinyl, indolinyl, isoindolinyl, quinuclidinyl, chromanyl, isochromanyl, and benzoxazinyl. Examples of monocyclic saturated or partially saturated ring systems are tetrahydrofuran-2-yl, tetrahydrofuran-3-yl, imidazolidin-1-yl, imidazolidin-2-yl, imidazolidin-4-yl, pyrrolidin-1-yl, pyrrolidin-2-yl, pyrrolidin-3-yl, piperidin-1-yl, piperidin-2-yl, piperidin-3-yl, piperazin-1-yl, piperazin-2-yl, piperazin-3-yl, 1,3-oxazolidin-3-yl, isothiazolidine, 1,3-thiazolidin-3-yl, 1,2-pyrazolidin-2-yl, 1,3-pyrazolidin-1-yl, thiomorpholin-yl, 1,2-tetrahydrothiazin-2-yl, 1,3-tetrahydrothiazin-3-yl, tetrahydrothiadiazin-yl, morpholin-yl, 1,2-tetrahydrodiazin-2-yl, 1,3-tetrahydrodiazin-1-yl, 1,4-oxazin-2-yl, and 1,2,5-oxathiazin-4-yl. Heterocyclic groups can be unsubstituted or substituted by one or more suitable substituents, preferably 1 to 3 suitable substituents, as defined above.

The term "hydroxy," as used herein, refers to an —OH group.

The term "oxo," as used herein, refers to a double bonded oxygen (=O) radical wherein the bond partner is a carbon atom. Such a radical can also be thought as a carbonyl group.

The term "counterion," as used herein, means a halide (e.g., fluoride, chloride, bromide, iodide), a carboxylate anion, such as selected from deprotonation of mineral acid, acrylic acid, acetic acid, methacrylic acid, glycolic acid, thioglycolic acid, propionic acid, butyric acid, and the like, or any other anionic constituent that satisfies the charge balance necessary to form a neutral molecule.

The term "sweetening," as used herein, can refer to a process that removes sulfur species from a gas or liquid. The sulfur species can include hydrogen sulfide and mercaptans.

The term "sour gas," as used herein, can refer to a gas that includes significant amounts of sulfur species, such as hydrogen sulfide and/or mercaptans.

The term "sour liquid" or "sour fluid," as used herein, can refer to a liquid that includes significant amounts of sulfur species, such as hydrogen sulfide and/or mercaptans.

The term "water cut," as used herein, means the percentage of water in a composition containing an oil and water mixture.

2. COMPOUNDS

Compounds of the invention include scavengers of sulfur-based species, such as hydrogen sulfide and mercaptans. The compounds can be particularly useful for scavenging of hydrogen sulfide and/or mercaptans from liquids and gases found in the oil, gas, and/or coal industries. The compounds can be alpha- or beta-functionalized epoxides.

In one aspect, compounds of the invention have Formula I,

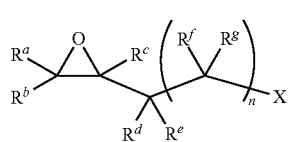

(I)

wherein,

X is selected from the group consisting of —OH, —SH, and —NHR$^3$;

R$^3$ is selected from the group consisting of hydrogen, alkyl, alkenyl, alkynyl, aryl, heteroaryl, heterocycle, cycloalkyl, and —C(O)R$^7$;

R$^7$ is selected from the group consisting of —OR$^{15}$, —SR$^{16}$, —NR$^{17}$R$^{18}$, hydrogen, alkyl, alkenyl, alkynyl, aryl, heteroaryl, heterocycle, and cycloalkyl;

R$^{15}$, R$^{16}$, R$^{17}$, and R$^{18}$ are each independently selected from the group consisting of hydrogen, alkyl, alkenyl, alkynyl, aryl, heteroaryl, heterocycle, and cycloalkyl;

R$^a$, R$^b$, R$^c$, R$^d$, R$^e$, R$^f$, and R$^g$ are each independently selected from the group consisting of hydrogen, halogen, alkyl, alkenyl, alkynyl, aryl, heteroaryl, heterocycle, and cycloalkyl; or R$^d$ and R$^f$ together with the carbon atoms to which they are attached form an aryl or a heteroaryl, provided that R$^e$ and R$^g$ are absent when R$^d$ and R$^f$ together with the carbon atoms to which they are attached form an aryl or a heteroaryl; and n is 0 or 1;

wherein said alkyl, alkenyl, alkynyl, aryl, heteroaryl, heterocycle, and cycloalkyl are each independently, at each occurrence, substituted or unsubstituted with one or more suitable substituents.

It is to be understood that when n is 0, then —[C(R$^f$)(R$^g$)]— of Formula I is absent. It is also to be understood that when R$^d$ and R$^f$ together with the carbon atoms to which they are attached form an aryl, a heteroaryl, a heterocycle, or a cycloalkyl, then n is 1. It is also to be understood that when R$^d$ and R$^f$ together with the carbon atoms to which they are attached form a cyclic group (e.g., aryl, heteroaryl, heterocycle, cycloalkyl) and there is a double bond between —[C(R$^d$)(R$^e$)]— and —[C(R$^f$)(R$^g$)]—, then R$^e$ and R$^g$ are absent.

Compounds of Formula I can have X be —OH.
Compounds of Formula I can have X be —SH.
Compounds of Formula I can have X be —NHR$^3$ wherein R$^3$ is hydrogen, alkyl, alkenyl, alkynyl, aryl, heteroaryl, heterocycle, cycloalkyl, or —C(O)R$^7$. In certain embodiments, X is —NHR$^3$ wherein R$^3$ is hydrogen.

Compounds of Formula I can have X be —NHR$^3$ wherein R$^3$ is C$_1$-alkyl, C$_2$-alkyl, C$_3$-alkyl, C$_4$-alkyl, C$_5$-alkyl, or C$_6$-alkyl.

Compounds of Formula I can have R$^a$, R$^b$R$^c$, R$^d$, R$^e$, R$^f$, and R$^g$ each independently be selected from the group consisting of hydrogen, halogen, alkyl, alkenyl, alkynyl, aryl, heteroaryl, heterocycle, and cycloalkyl.

Compounds of Formula I can also have R$^a$, R$^b$, R$^c$, R$^d$, R$^e$, R$^f$, and R$^g$ each independently be selected from the group consisting of hydrogen, substituted or unsubstituted alkyl, and halogen.

Compounds of Formula I can further have R$^a$, R$^b$, R$^c$, R$^d$, R$^e$, R$^f$, and R$^g$ each independently be selected from the group consisting of hydrogen, substituted or unsubstituted C$_1$-C$_{10}$-alkyl, fluoro, bromo, and iodo.

Compounds of Formula I can have R$^a$, R$^b$, and R$^c$ each independently be selected from the group consisting of hydrogen, alkyl, alkenyl, alkynyl, aryl, heteroaryl, heterocycle, and cycloalkyl; R$^d$ and R$^f$ together with the carbon atoms to which they are attached form an aryl group (e.g., phenyl); R$^e$ is absent; R$^g$ is absent; and n is 1.

Preferably, X is —OH; R$^a$ is hydrogen or substituted or unsubstituted alkyl; R$^b$ is hydrogen; R$^c$ is hydrogen; R$^d$ is hydrogen or substituted or unsubstituted alkyl; R$^e$ is hydrogen; and n is 0.

Further for compounds of Formula I, X is —OH; R$^a$ is hydrogen; R$^b$ is hydrogen; R$^c$ is hydrogen; R$^d$ is hydrogen or substituted or unsubstituted alkyl; R$^e$ is hydrogen; and n is 0.

Compounds of Formula I can have groups where X is —OH; R$^a$ is hydrogen; R$^b$ is hydrogen; R$^c$ is hydrogen; R$^d$ is substituted or unsubstituted alkyl; R$^e$ is hydrogen; and n is 0.

Also for compounds of Formula I, X is —OH; R$^a$ is hydrogen or substituted or unsubstituted alkyl; R$^b$ is hydrogen; R$^c$ is hydrogen; R$^d$ is hydrogen; R$^e$ is hydrogen; and n is 0.

Further for compounds of Formula I, X is —OH; R$^a$ is substituted or unsubstituted alkyl; R$^b$ is hydrogen; R$^c$ is hydrogen; R$^d$ is substituted or unsubstituted alkyl; R$^e$ is hydrogen; and n is 0.

Also for compounds of Formula I, X is —OH; R$^a$ is substituted or unsubstituted alkyl; R$^b$ is hydrogen; R$^c$ is hydrogen; R$^d$ is hydrogen; R$^e$ is hydrogen; and n is 0.

In compounds of Formula I, X is —OH; R$^a$ is hydrogen; R$^b$ is hydrogen; R$^c$ is hydrogen; R$^d$ is hydrogen; R$^e$ is hydrogen; and n is 0.

Compounds of Formula I can have structures where X is —OH; R$^a$ is hydrogen or unsubstituted C$_1$-C$_{10}$-alkyl; R$^b$ is hydrogen; R$^c$ is hydrogen; R$^d$ is hydrogen or unsubstituted C$_1$-C$_{10}$-alkyl; R$^e$ is hydrogen; and n is 0.

Compounds of Formula I can also have structures where X is —OH; R$^a$ is hydrogen; R$^b$ is hydrogen; R$^c$ is hydrogen; R$^d$ is hydrogen or unsubstituted C$_1$-C$_{10}$-alkyl; R$^e$ is hydrogen; and n is 0.

Additionally, compounds of Formula I can have structures where X is —OH; R$^a$ is hydrogen; R$^b$ is hydrogen; R$^c$ is hydrogen; R$^d$ is unsubstituted C$_1$-C$_{10}$-alkyl; R$^e$ is hydrogen; and n is 0.

Compounds of Formula I can have structures where X is —OH; R$^a$ is hydrogen or unsubstituted C$_1$-C$_{10}$-alkyl; R$^b$ is hydrogen; R$^c$ is hydrogen; R$^d$ is hydrogen; R$^e$ is hydrogen; and n is 0.

Further, compounds of Formula I can have structures where X is —OH; R$^a$ is unsubstituted C$_1$-C$_{10}$-alkyl; R$^b$ is hydrogen; R$^c$ is hydrogen; R$^d$ is unsubstituted C$_1$-C$_{10}$-alkyl; R$^e$ is hydrogen; and n is 0.

Compounds of Formula I can have structures where X is —OH; R$^a$ is unsubstituted C$_1$-C$_{10}$-alkyl; R$^b$ is hydrogen; R$^c$ is hydrogen; R$^d$ is hydrogen; R$^e$ is hydrogen; and n is 0.

Further, compounds of Formula I can have structures where X is —OH; R$^a$ is hydrogen or substituted or unsubstituted alkyl; R$^b$ is hydrogen; R$^c$ is hydrogen; R$^d$ is hydrogen; R$^e$ is hydrogen; R$^f$ is hydrogen or substituted or unsubstituted alkyl; R$^g$ is hydrogen; and n is 1.

Compounds of Formula I can have structures where X is —OH; $R^a$ is hydrogen; $R^b$ is hydrogen; $R^c$ is hydrogen; $R^d$ is hydrogen; $R^e$ is hydrogen; $R^f$ is hydrogen or substituted or unsubstituted alkyl; $R^g$ is hydrogen; and n is 1.

Additionally, compounds of Formula I can have structures where X is —OH; $R^a$ is hydrogen; $R^b$ is hydrogen; $R^c$ is hydrogen; $R^d$ is hydrogen; $R^e$ is hydrogen; $R^f$ is substituted or unsubstituted alkyl; $R^g$ is hydrogen; and n is 1.

Compounds of Formula I can have structures where X is —OH; $R^a$ is hydrogen or substituted or unsubstituted alkyl; $R^b$ is hydrogen; $R^c$ is hydrogen; $R^d$ is hydrogen; $R^e$ is hydrogen; $R^f$ is hydrogen; $R^g$ is hydrogen; and n is 1.

Further, compounds of Formula I can have structures where X is —OH; $R^a$ is substituted or unsubstituted alkyl; $R^b$ is hydrogen; $R^c$ is hydrogen; $R^d$ is hydrogen; $R^e$ is hydrogen; $R^f$ is substituted or unsubstituted alkyl; $R^g$ is hydrogen; and n is 1.

Compounds of Formula I can have structures where X is —OH; $R^a$ is substituted or unsubstituted alkyl; $R^b$ is hydrogen; $R^c$ is hydrogen; $R^d$ is hydrogen; $R^e$ is hydrogen; $R^f$ is hydrogen; $R^g$ is hydrogen; and n is 1.

Compounds of Formula I can have structures where X is —OH; $R^a$ is hydrogen; $R^b$ is hydrogen; $R^c$ is hydrogen; $R^d$ is hydrogen; $R^e$ is hydrogen; $R^f$ is hydrogen; $R^g$ is hydrogen; and n is 1.

Compounds of Formula I can have structures where X is —OH; $R^a$ is hydrogen or unsubstituted $C_1$-$C_{10}$-alkyl; $R^b$ is hydrogen; $R^c$ is hydrogen; $R^d$ is hydrogen; $R^e$ is hydrogen; $R^f$ is hydrogen or unsubstituted $C_1$-$C_{10}$-alkyl; $R^g$ is hydrogen; and n is 1.

Compounds of Formula I can have structures where X is —OH; $R^a$ is hydrogen; $R^b$ is hydrogen; $R^c$ is hydrogen; $R^d$ is hydrogen; $R^e$ is hydrogen; $R^f$ is hydrogen or unsubstituted $C_1$-$C_{10}$-alkyl; $R^g$ is hydrogen; and n is 1.

Compounds of Formula I can have structures where X is —OH; $R^a$ is hydrogen; $R^b$ is hydrogen; $R^c$ is hydrogen; $R^d$ is hydrogen; $R^e$ is hydrogen; $R^f$ is unsubstituted $C_1$-$C_{10}$-alkyl; $R^g$ is hydrogen; and n is 1.

Compounds of Formula I can have structures where X is —OH; $R^a$ is hydrogen or unsubstituted $C_1$-$C_{10}$-alkyl; $R^b$ is hydrogen; $R^c$ is hydrogen; $R^d$ is hydrogen; $R^e$ is hydrogen; $R^f$ is hydrogen; $R^g$ is hydrogen; and n is 1.

Compounds of Formula I can have structures where X is —OH; $R^a$ is unsubstituted $C_1$-$C_{10}$-alkyl; $R^b$ is hydrogen; $R^c$ is hydrogen; $R^d$ is hydrogen; $R^e$ is hydrogen; $R^f$ is unsubstituted $C_1$-$C_{10}$-alkyl; $R^g$ is hydrogen; and n is 1.

Compounds of Formula I can have structures where X is —OH; $R^a$ is unsubstituted $C_1$-$C_{10}$-alkyl; $R^b$ is hydrogen; $R^c$ is hydrogen; $R^d$ is hydrogen; $R^e$ is hydrogen; $R^f$ is hydrogen; $R^g$ is hydrogen; and n is 1.

Compounds of Formula I can have structures where X is —OH; $R^a$ is hydrogen; $R^b$ is hydrogen; $R^c$ is hydrogen; $R^d$ and $R^f$ together with the carbon atoms to which they are attached form a phenyl group, optionally having one to four suitable substituents in addition to the —OH; $R^e$ is absent; $R^g$ is absent; and n is 1.

Compounds of Formula I can have structures where X is —OH; $R^a$ is —$(CH_2)_7$—C(O)$OR^x$, wherein $R^x$ is selected from the group consisting of hydrogen, alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently, at each occurrence, substituted or unsubstituted with one or more suitable substituents; $R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1. In another preferred embodiment, X is —OH; $R^a$ is —$(CH_2)_7$—C(O)$OR^x$, wherein $R^x$ is hydrogen; $R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Compounds of Formula I can have structures where X is —OH; $R^a$ is —$(CH_2)_7$—C(O)$OR^x$, wherein $R^x$ is unsubstituted $C_1$-$C_{10}$-alkyl; $R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Compounds of Formula I can have structures where X is —OH; $R^a$ is —$(CH_2)_7$—C(O)$OR^x$, wherein $R^x$ is methyl; $R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Compounds of Formula I can have structures where X is —OH; $R^a$ is —$(CH_2)_7$—C(O)$OR^x$, wherein $R^x$ is 2,3-dihydroxypropyl (i.e., —$CH_2$—CHOH—$CH_2OH$); $R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Compounds of Formula I can have structures where X is —OH; $R^a$ is —$(CH_2)_7$—C(O)$OR^x$, wherein $R^x$ is

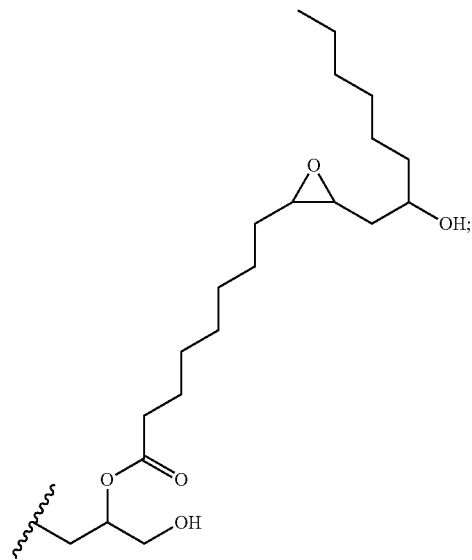 [SMILES: *CC(CO)OC(=O)CCCCCCCC1OC1CC(O)CCCCCC]

$R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Compounds of Formula I can have structures where X is —OH; $R^a$ is —$(CH_2)_7$—C(O)$OR^x$, wherein $R^x$ is

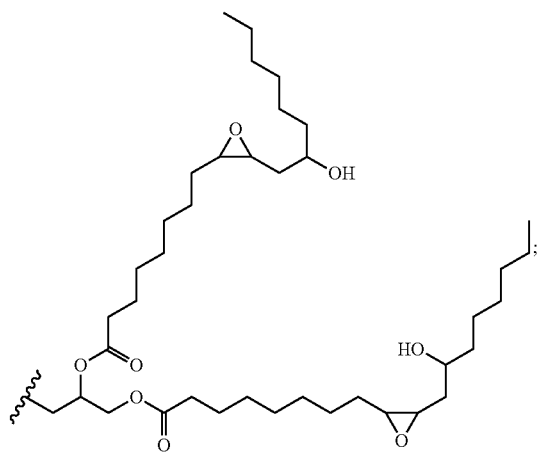 [SMILES: *CC(COC(=O)CCCCCCCC1OC1CC(O)CCCCCC)OC(=O)CCCCCCCC1OC1CC(O)CCCCCC]

$R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.

Specifically preferred embodiments include, but are not limited to, compounds (i)-(xii):
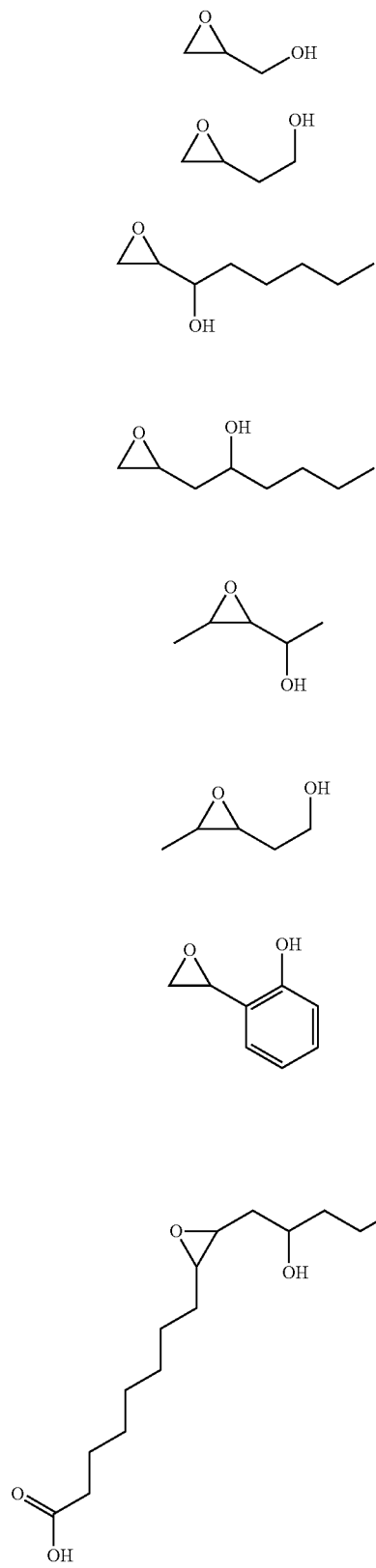
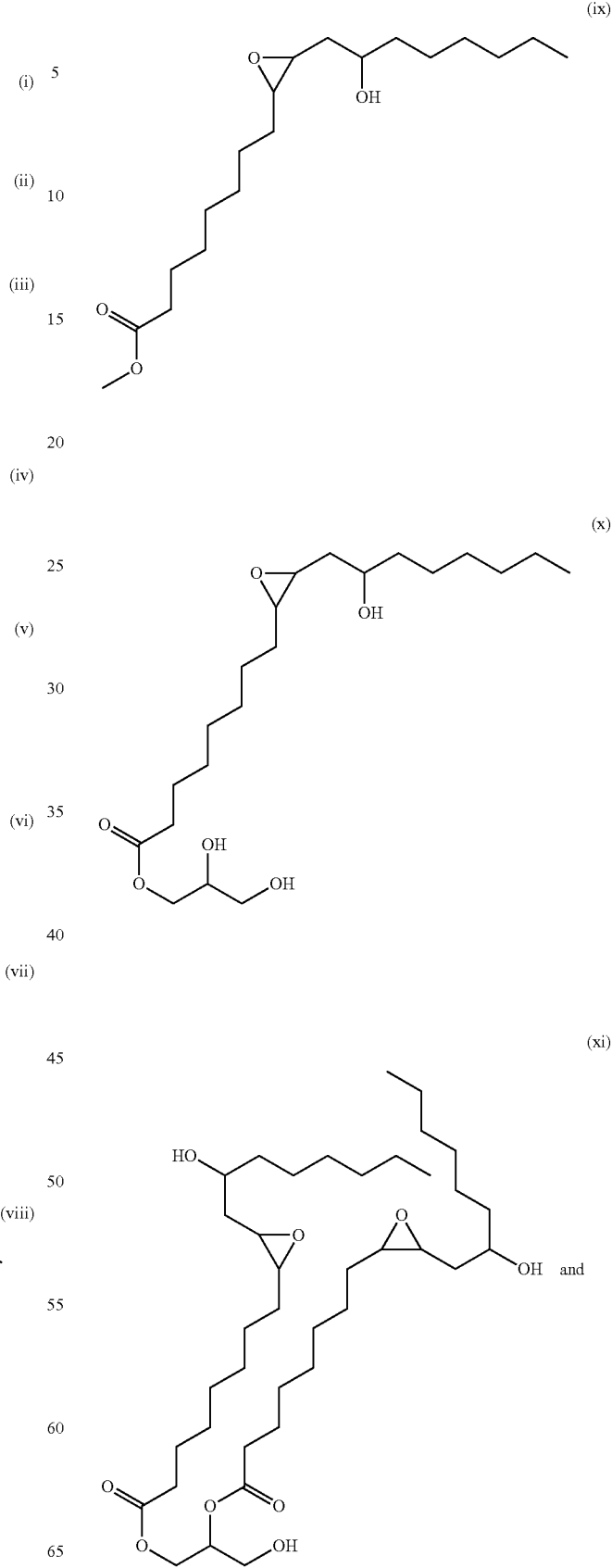

(xii)

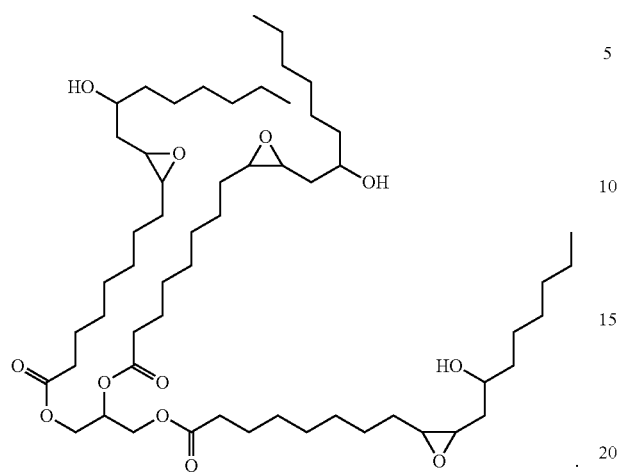

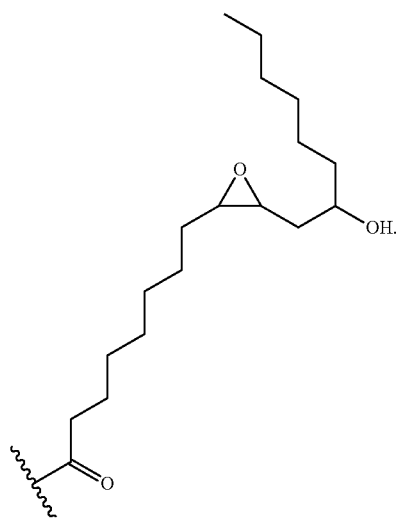 [SMILES: *C(=O)CCCCCCCC1OC1CC(O)CCCCCC]

In another aspect, compounds of the invention have Formula II,

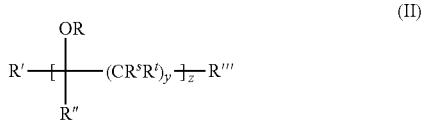

(II)

wherein

R is independently, at each occurrence, selected from the group consisting of hydrogen and a moiety comprising an α- or β-functionalized epoxide, said α- or β-functionalization selected from the group consisting of —OH, —SH, and —NHR$^{23}$, wherein at least one R group is a moiety comprising said α- or β-functionalized epoxide;

R$^{23}$ is selected from the group consisting of hydrogen, alkyl, alkenyl, alkynyl, aryl, heteroaryl, heterocycle, cycloalkyl, and —C(O)R$^{27}$;

R$^{27}$ is selected from the group consisting of —OR$^{35}$, —SR$^{36}$, —NR$^{37}$R$^{38}$, hydrogen, alkyl, alkenyl, alkynyl, aryl, heteroaryl, heterocycle, and cycloalkyl;

R$^{35}$, R$^{36}$, R$^{37}$, and R$^{38}$ are each independently selected from the group consisting of hydrogen, alkyl, alkenyl, alkynyl, aryl, heteroaryl, heterocycle, and cycloalkyl;

R', R", R'", R$^s$, and R$^t$ are each independently, at each occurrence, selected from the group consisting of hydrogen, halogen, alkyl, alkenyl, alkynyl, aryl, heteroaryl, heterocycle, and cycloalkyl;

y is independently, at each occurrence, an integer selected from 0 to 6; and z is an integer selected from 1 to 20;

wherein said alkyl, alkenyl, alkynyl, aryl, heteroaryl, heterocycle, and cycloalkyl are each independently, at each occurrence, substituted or unsubstituted with one or more suitable substituents.

In compound having Formula II, R can independently be, at each occurrence, selected from the group consisting of hydrogen and a moiety of formula:

For compounds of Formula II, R', R", R'", R$^s$, and R$^t$ are each independently, at each occurrence, selected from the group consisting of hydrogen and alkyl.

Compounds of Formula II can have structures where R', R", R'", R$^s$, and R$^t$ are each independently, at each occurrence, selected from the group consisting of hydrogen and unsubstituted $C_1$-$C_{10}$-alkyl.

Compounds of Formula II can have structures where R', R", R'", R$^s$, and R$^t$ are each independently, at each occurrence, a hydrogen.

Compounds of Formula II can have structures where y is 0 at each occurrence.

Compounds of Formula II can have structures where z is an integer selected from 1, 2, 3, 4, 5, or 6. In certain embodiments, z is 3.

Compounds of Formula II can have structures where R is independently, at each occurrence, selected from the group consisting of hydrogen and a moiety of formula:

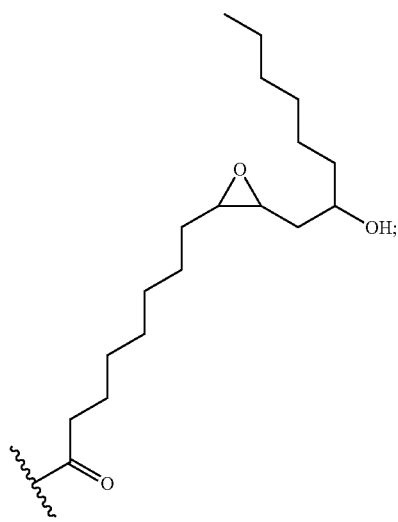 [SMILES: *C(=O)CCCCCCCC1OC1CC(O)CCCCCC]

R', R", and R'" are each hydrogen;
y is 0 at each occurrence; and
z is 3.

Specifically preferred compounds include, but are not limited to, compounds (x)-(xii):

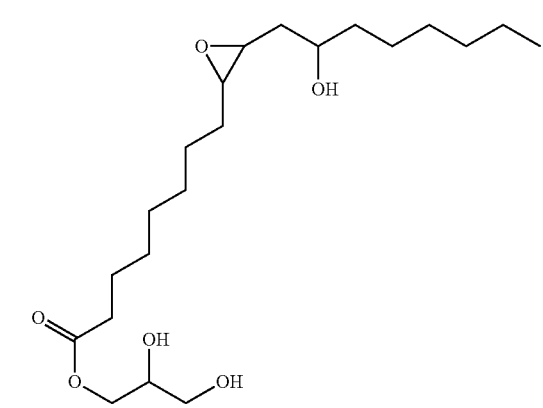

(x)

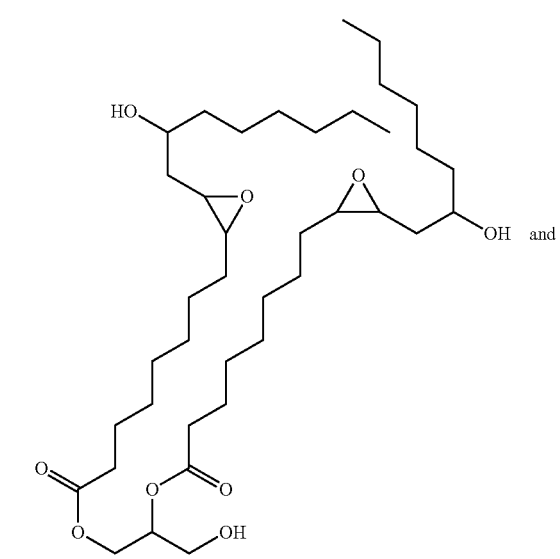

(xi)

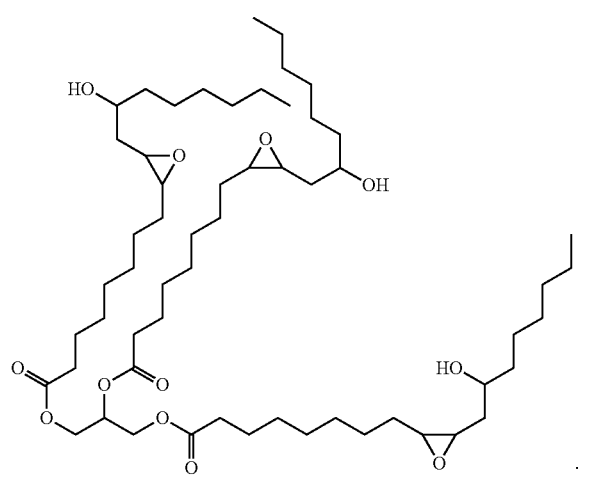

(xii)

In another aspect, compounds of the invention include compounds prepared from epoxidation of castor oil or a castor oil derivative (e.g., ricinoleic acid, ricinoleic acid methyl ester, glyceryl monoricinoleate, glyceryl diricinoleate).

The compounds of the invention can contain asymmetric centers and can thus occur as racemates and racemic mixtures, single enantiomers, diastereomeric mixtures and individual diastereomers. Additional asymmetric centers can be present depending upon the nature of the various substituents on the molecule. Each such asymmetric center will independently produce two optical isomers and it is intended that all of the possible optical isomers and diastereomers in mixtures and as pure or partially purified compounds are included within the scope of this invention. The present invention is meant to comprehend all such isomeric forms of these compounds.

Without being bound by theory, it is believed compounds of the invention are able to accomplish scavenging of hydrogen sulfide and mercaptans by reacting with mercaptans and/or hydrogen sulfide to form an alternate functionality. For example, as shown in Scheme 1, an epoxide of formula (1) can react with a sulfur-based species of formula (2), wherein $R^{50}$ is selected from the group consisting of hydrogen, alkyl, alkenyl, alkynyl, aryl, heteroaryl, heterocycle, and cycloalkyl. The resulting thiol or thioether compound (3) can be removed from the medium. Optionally, where the sulfur-based species of formula (2) is hydrogen sulfide (i.e., wherein $R^{50}$ is H), the resulting thiol of formula (3) can react with an additional equivalent of epoxide (1) to form a non-volatile mercaptan of formula (4).

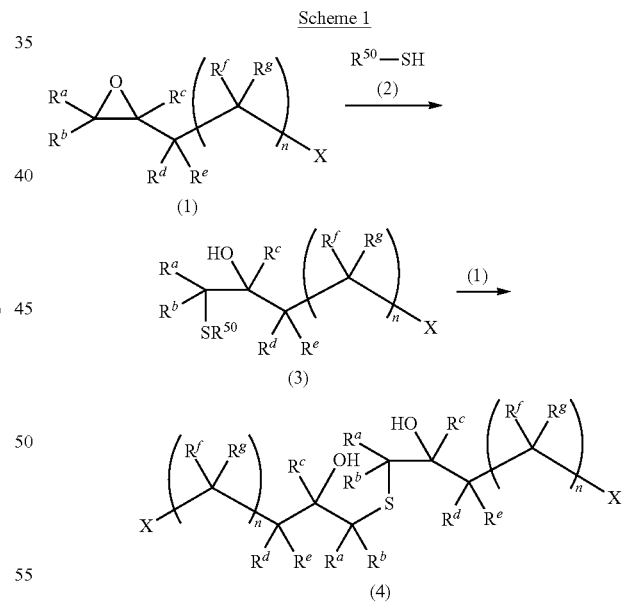

Scheme 1

The unexpected superior scavenging ability of the epoxide compounds disclosed herein is believed to result from intramolecular acid catalyzation of the epoxide by the adjacent α- or β-functionality, which weakens the epoxide C—O bond and promotes nucleophilic addition of mercaptans and/or hydrogen sulfide to form an alternate functionality. As shown in Scheme 2, the α- or β-functionalization can activate the epoxide for nucleophilic addition by serving as a hydrogen bond donor to the epoxide oxygen atom.

Scheme 2

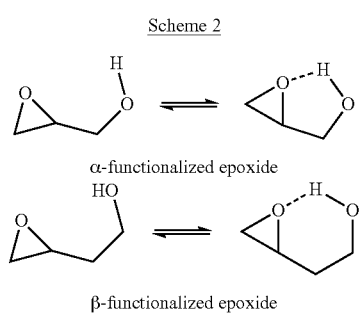

α-functionalized epoxide

β-functionalized epoxide

3. COMPOSITIONS

The compositions disclosed herein include at least one compound having the structure of Formula I or II as described above. A composition of the invention can contain a pure composition of a compound of Formula I. Further, a composition of the invention can contain a mixture of two or more structurally distinct compounds of Formula I.

A composition of the invention can contain a pure composition of a compound of Formula II. A composition of the invention contains a mixture of two or more structurally distinct compounds of Formula II.

A composition of the invention comprises one or more epoxide compounds prepared from epoxidation of castor oil or a castor oil derivative, or any combination thereof.

A composition of the invention comprises from about 20 to about 100 percent by weight of one or more compounds of the invention, or from about 20 to about 98 percent by weight of one or more compounds of the invention, or from about 50 to 97 percent by weight of one or more compounds of the invention. A composition of the invention comprises about 50 percent by weight of one or more compounds of the invention.

The compositions of the invention can optionally include one or more additives. Suitable additives include, but are not limited to, asphaltene inhibitors, paraffin inhibitors, corrosion inhibitors, scale inhibitors, emulsifiers, water clarifiers, dispersants, emulsion breakers, hydrogen sulfide scavengers, gas hydrate inhibitors, biocides, pH modifiers, surfactants, and solvents.

a. Asphaltene Inhibitors

Suitable asphaltene inhibitors include, but are not limited to, aliphatic sulphonic acids; alkyl aryl sulphonic acids; aryl sulfonates; lignosulfonates; alkylphenol/aldehyde resins and similar sulfonated resins; polyolefin esters; polyolefin imides; polyolefin esters with alkyl, alkylenephenyl or alkylenepyridyl functional groups; polyolefin amides; polyolefin amides with alkyl, alkylenephenyl or alkylenepyridyl functional groups; polyolefin imides with alkyl, alkylenephenyl or alkylenepyridyl functional groups; alkenyl/vinyl pyrrolidone copolymers; graft polymers of polyolefins with maleic anhydride or vinyl imidazole; hyperbranched polyester amides; polyalkoxylated asphaltenes, amphoteric fatty acids, salts of alkyl succinates, sorbitan monooleate, and polyisobutylene succinic anhydride.

b. Paraffin Inhibitors

Suitable paraffin inhibitors include, but are not limited to, paraffin crystal modifiers, and dispersant/crystal modifier combinations. Suitable paraffin crystal modifiers include, but are not limited to, alkyl acrylate copolymers, alkyl acrylate vinylpyridine copolymers, ethylene vinyl acetate copolymers, maleic anhydride ester copolymers, branched polyethylenes, naphthalene, anthracene, microcrystalline wax and/or asphaltenes. Suitable dispersants include, but are not limited to, dodecyl benzene sulfonate, oxyalkylated alkylphenols, and oxyalkylated alkylpnenolic resins.

c. Corrosion Inhibitors

Suitable corrosion inhibitors include, but are not limited to, alkyl, hydroxyalkyl, alkylaryl, arylalkyl or arylamine quaternary salts; mono or polycyclic aromatic amine salts; imidazoline derivatives; mono-, di- or trialkyl or alkylaryl phosphate esters; phosphate esters of hydroxylamines; phosphate esters of polyols; and monomeric or oligomeric fatty acids.

Suitable alkyl, hydroxyalkyl, alkylaryl arylalkyl or arylamine quaternary salts include those alkylaryl, arylalkyl and arylamine quaternary salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I. In certain embodiments, $R^{5a}$, $R^{6a}$, $R^{7a}$, and $R^{8a}$ are each independently selected from the group consisting of alkyl (e.g., $C_1$-$C_{18}$ alkyl), hydroxyalkyl (e.g., $C_1$-$C_{18}$ hydroxyalkyl), and arylalkyl (e.g., benzyl). The mono or polycyclic aromatic amine salt with an alkyl or alkylaryl halide include salts of the formula $[N^+R^{5a}R^{6a}R^{7a}R^{8a}][X^-]$ wherein $R^{5a}$, $R^{6a}$, $R^{7a}$, and $R^{8a}$ contain one to 18 carbon atoms, and X is Cl, Br or I.

Suitable quaternary ammonium salts include tetramethyl ammonium chloride, tetraethyl ammonium chloride, tetrapropyl ammonium chloride, tetrabutyl ammonium chloride, tetrahexyl ammonium chloride, tetraoctyl ammonium chloride, benzyltrimethyl ammonium chloride, benzyltriethyl ammonium chloride, phenyltrimethyl ammonium chloride, phenyltriethyl ammonium chloride, cetyl benzyldimethyl ammonium chloride, and hexadecyl trimethyl ammonium chloride. In certain embodiments, the quaternary ammonium salt is an alkylamine benzyl quaternary ammonium salt, a benzyl triethanolamine quaternary ammonium salt or a benzyl dimethylaminoethanolamine quaternary ammonium salt.

The corrosion inhibitor can be a quaternary ammonium or alkyl pyridinium quaternary salt such as those represented by the general formula:

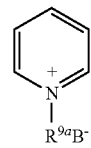

wherein $R^{9a}$ is an alkyl group, an aryl group, or an arylalkyl group, wherein said alkyl groups have from 1 to about 18 carbon atoms and B is Cl, Br or I. Among these compounds are alkyl pyridinium salts and alkyl pyridinium benzyl quats. Exemplary compounds include methylpyridinium chloride, ethyl pyridinium chloride, propyl pyridinium chloride, butyl pyridinium chloride, octyl pyridinium chloride, decyl pyridinium chloride, lauryl pyridinium chloride, cetyl pyridinium chloride, benzyl pyridinium and an alkyl benzyl pyridinium chloride, preferably wherein the alkyl is a $C_1$-$C_6$ hydrocarbyl group. In certain embodiments, the corrosion inhibitor includes benzyl pyridinium chloride.

The corrosion inhibitor can be an imidazoline derived from a diamine, such as ethylene diamine (EDA), diethylene triamine (DETA), triethylene tetraamine (TETA) etc. and a long chain fatty acid such as tall oil fatty acid (TOFA). Suitable imidazolines include those of formula:

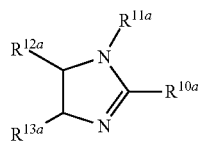

wherein $R^{12a}$ and $R^{13a}$ are independently a $C_1$-$C_6$ alkyl group or hydrogen, $R^{11a}$ is hydrogen, $C_1$-$C_6$ alkyl, $C_1$-$C_6$ hydroxyalkyl, or $C_1$-$C_6$ arylalkyl, and $R^{10a}$ is a $C_1$-$C_{20}$ alkyl or a $C_1$-$C_{20}$ alkoxyalkyl group. In a certain embodiments, $R^{11a}$, $R^{12a}$ and $R^{13a}$ are each hydrogen and $R^{10a}$ is the alkyl mixture typical in tall oil fatty acid (TOFA).

The corrosion inhibitor compound can be an imidazolinium compound of the following formula:

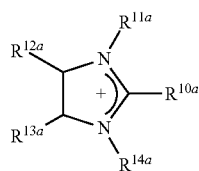

wherein $R^{12a}$ and $R^{13a}$ are independently a $C_1$-$C_6$ alkyl group or hydrogen, $R^{11a}$ and $R^{14a}$ are independently hydrogen, $C_1$-$C_6$ alkyl, $C_1$-$C_6$ hydroxyalkyl, or $C_1$-$C_6$ arylalkyl, and $R^{10}$ is a $C_1$-$C_{20}$ alkyl or a $C_1$-$C_{20}$ alkoxyalkyl group.

Suitable mono-, di- and trialkyl as well as alkylaryl phosphate esters and phosphate esters of mono, di, and triethanolamine typically contain between from 1 to about 18 carbon atoms. Preferred mono-, di- and trialkyl phosphate esters, alkylaryl or arylalkyl phosphate esters are those prepared by reacting a $C_3$-$C_{18}$ aliphatic alcohol with phosphorous pentoxide. The phosphate intermediate interchanges its ester groups with triethyl phosphate with triethylphosphate producing a more broad distribution of alkyl phosphate esters. Alternatively, the phosphate ester can be made by admixing with an alkyl diester, a mixture of low molecular weight alkyl alcohols or diols. The low molecular weight alkyl alcohols or diols preferably include $C_6$ to $C_{10}$ alcohols or diols. Further, phosphate esters of polyols and their salts containing one or more 2-hydroxyethyl groups, and hydroxylamine phosphate esters obtained by reacting polyphosphoric acid or phosphorus pentoxide with hydroxylamines such as diethanolamine or triethanolamine are preferred.

The corrosion inhibitor compound can further be a monomeric or oligomeric fatty acid. Preferred are $C_{14}$-$C_{22}$ saturated and unsaturated fatty acids as well as dimer, trimer and oligomer products obtained by polymerizing one or more of such fatty acids.

d. Scale Inhibitors

Suitable scale inhibitors include, but are not limited to, phosphates, phosphate esters, phosphoric acids, phosphonates, phosphonic acids, polyacrylamides, salts of acrylamido-methyl propane sulfonate/acrylic acid copolymer (AMPS/AA), phosphinated maleic copolymer (PHOS/MA), and salts of a polymaleic acid/acrylic acid/acrylamidomethyl propane sulfonate terpolymer (PMA/AMPS).

e. Emulsifiers

Suitable emulsifiers include, but are not limited to, salts of carboxylic acids, products of acylation reactions between carboxylic acids or carboxylic anhydrides and amines, and alkyl, acyl and amide derivatives of saccharides (alkylsaccharide emulsifiers).

f. Water Clarifiers

Suitable water clarifiers include, but are not limited to, inorganic metal salts such as alum, aluminum chloride, and aluminum chlorohydrate, or organic polymers such as acrylic acid based polymers, acrylamide based polymers, polymerized amines, alkanolamines, thiocarbamates, and cationic polymers such as diallyldimethylammonium chloride (DADMAC).

g. Dispersants

Suitable dispersants include, but are not limited to, aliphatic phosphonic acids with 2-50 carbons, such as hydroxyethyl diphosphonic acid, and aminoalkyl phosphonic acids, e.g. polyaminomethylene phosphonates with 2-10 N atoms e.g. each bearing at least one methylene phosphonic acid group; examples of the latter are ethylenediamine tetra(methylene phosphonate), diethylenetriamine penta(methylene phosphonate) and the triamine- and tetramine-polymethylene phosphonates with 2-4 methylene groups between each N atom, at least 2 of the numbers of methylene groups in each phosphonate being different. Other suitable dispersion agents include lignin or derivatives of lignin such as lignosulfonate and naphthalene sulfonic acid and derivatives.

h. Emulsion Breakers

Suitable emulsion breakers include, but are not limited to, dodecylbenzylsulfonic acid (DDBSA), the sodium salt of xylenesulfonic acid (NAXSA), epoxylated and propoxylated compounds, anionic cationic and nonionic surfactants, and resins, such as phenolic and epoxide resins.

i. Hydrogen Sulfide Scavengers

Suitable additional hydrogen sulfide scavengers include, but are not limited to, oxidants (e.g., inorganic peroxides such as sodium peroxide, or chlorine dioxide), aldehydes (e.g., of 1-10 carbons such as formaldehyde or glutaraldehyde or (meth)acrolein), triazines (e.g., monoethanol amine triazine, monomethylamine triazine, and triazines from multiple amines or mixtures thereof), and glyoxal.

j. Gas Hydrate Inhibitors

Suitable gas hydrate inhibitors include, but are not limited to, thermodynamic hydrate inhibitors (THI), kinetic hydrate inhibitors (KHI), and anti-agglomerates (AA). Suitable thermodynamic hydrate inhibitors include, but are not limited to, NaCl salt, KCl salt, $CaCl_2$ salt, $MgCl_2$ salt, $NaBr_2$ salt, formate brines (e.g. potassium formate), polyols (such as glucose, sucrose, fructose, maltose, lactose, gluconate, monoethylene glycol, diethylene glycol, triethylene glycol, mono-propylene glycol, dipropylene glycol, tripropylene glycols, tetrapropylene glycol, monobutylene glycol, dibutylene glycol, tributylene glycol, glycerol, diglycerol, triglycerol, and sugar alcohols (e.g. sorbitol, mannitol)), methanol, propanol, ethanol, glycol ethers (such as diethyleneglycol monomethylether, ethyleneglycol monobutylether), and alkyl or cyclic esters of alcohols (such as ethyl lactate, butyl lactate, methylethyl benzoate). Suitable kinetic hydrate inhibitors and anti-agglomerates include, but are not limited to, polymers and copolymers, polysaccharides (such as hydroxy-ethylcellulose (HEC), carboxymethylcellulose (CMC), starch, starch derivatives, and xanthan), lactams (such as polyvinylcaprolactam, polyvinyl lactam), pyrrolidones (such as polyvinyl pyrrolidone of various molecular weights), surfactants (such as fatty acid salts, ethoxylated alcohols, propoxylated alcohols, sorbitan esters, ethoxylated sorbitan esters, polyglycerol esters of fatty acids, alkyl glucosides, alkyl polyglucosides, alkyl sulfates, alkyl sulfonates, alkyl ester sulfonates, alkyl aromatic sulfonates, alkyl betaine, alkyl amido betaines), hydrocarbon based dispersants (such as lignosulfonates, iminodisuccinates, polyaspartates), amino acids, and proteins.

k. Biocides

Suitable biocides include, but are not limited to, oxidizing and non-oxidizing biocides. Suitable non-oxidizing biocides include, for example, aldehydes (e.g., formaldehyde, glutaraldehyde, and acrolein), amine-type compounds (e.g., quaternary amine compounds and cocodiamine), halogenated compounds (e.g., bronopol and 2-2-dibromo-3-nitrilopropionamide (DBNPA)), sulfur compounds (e.g., isothiazolone, carbamates, and metronidazole), and quaternary phosphonium salts (e.g., tetrakis(hydroxymethyl)phosphonium sulfate (THPS)). Suitable oxidizing biocides include, for example, sodium hypochlorite, trichloroisocyanuric acids, dichloroisocyanuric acid, calcium hypochlorite, lithium hypochlorite, chlorinated hydantoins, stabilized sodium hypobromite, activated sodium bromide, brominated hydantoins, chlorine dioxide, ozone, and peroxides.

l. pH Modifiers

Suitable pH modifiers include, but are not limited to, alkali hydroxides, alkali carbonates, alkali bicarbonates, alkaline earth metal hydroxides, alkaline earth metal carbonates, alkaline earth metal bicarbonates and mixtures or combinations thereof. Exemplary pH modifiers include NaOH, KOH, Ca(OH)$_2$, CaO, Na$_2$CO$_3$, KHCO$_3$, K$_2$CO$_3$, NaHCO$_3$, MgO, and Mg(OH)$_2$.

m. Surfactants

Suitable surfactants include, but are not limited to, anionic surfactants, cationic surfactants, zwitterionic surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkoyl polyethylene glycol esters and diesters. Also included are betaines and sultanes, amphoteric surfactants such as alkyl amphoacetates and amphodiacetates, alkyl amphopropripionates and amphodipropionates, and alkyliminodiprionate.

The surfactant can be a quaternary ammonium compound, an amine oxide, an ionic or non-ionic surfactant, or any combination thereof. Suitable quaternary amine compounds include, but are not limited to, alkyl benzyl ammonium chloride, benzyl cocoalkyl($C_{12}$-$C_{18}$)dimethylammonium chloride, dicocoalkyl ($C_{12}$-$C_{18}$)dimethylammonium chloride, ditallow dimethylammonium chloride, di(hydrogenated tallow alkyl)dimethyl quaternary ammonium methyl chloride, methyl bis(2-hydroxyethyl cocoalkyl($C_{12}$-$C_{18}$) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhyexyl) dimethyl quaternary ammonium methyl sulfate.

The surfactant is cocodimethyl amine oxide. The cocodimethyl amine oxide can be present in the composition in an amount ranging from about 0.1 wt % to about 30 wt %, or about 1 wt % to about 20 wt %. Preferably, the cocodimethyl amine oxide is present in the composition in an amount of 3 wt %. The cocodimethyl amine oxide can enhance scavenging ability of compounds of the invention.

n. Solvents

Suitable solvents include, but are not limited to, alcohols, hydrocarbons, ketones, ethers, aromatics, amides, nitriles, sulfoxides, esters, and aqueous systems. In certain embodiments, the solvent is water, isopropanol, methanol, ethanol, 2-ethylhexanol, heavy aromatic naphtha, toluene, ethylene glycol, ethylene glycol monobutyl ether (EGMBE), diethylene glycol monoethyl ether, or xylene. Representative polar solvents suitable for formulation with the composition include water, brine, seawater, alcohols (including straight chain or branched aliphatic such as methanol, ethanol, propanol, isopropanol, butanol, 2-ethylhexanol, hexanol, octanol, decanol, 2-butoxyethanol, etc.), glycols and derivatives (ethylene glycol, 1,2-propylene glycol, 1,3-propylene glycol, ethylene glycol monobutyl ether, etc.), ketones (cyclohexanone, diisobutylketone), N-methylpyrrolidinone (NMP), N,N-dimethylformamide and the like. Representative non-polar solvents suitable for formulation with the composition include aliphatics such as pentane, hexane, cyclohexane, methylcyclohexane, heptane, decane, dodecane, diesel, and the like; aromatics such as toluene, xylene, heavy aromatic naphtha, fatty acid derivatives (acids, esters, amides), and the like.

The solvent can be a polyhydroxylated solvent, a polyether, an alcohol, or a combination thereof.

The solvent can be monoethyleneglycol, methanol, dimethyl sulfoxide (DMSO), dimethylformamide (DMF), tetrahydrofuran (THF), or a combination thereof.

The solvent can be methyl carbitol (also referred to as 2-(2-methoxyethoxy) ethanol).

A composition of the invention can comprise from 0 to about 80 percent by weight of one or more solvents, based on the weight of the composition. A composition of the invention can comprise from 0 to about 50 percent by weight of one or more solvents, based on the weight of the composition. A composition of the invention can comprise 20%, 25%, 30%, 35%, 40%, 45%, 50%, 55%, or 60% by weight of one or more solvents, based on the weight of the composition.

o. Additional Components

Compositions made according to the invention can further include additional functional agents or additives that provide a beneficial property. Additional agents or additives will vary according to the particular scavenging composition being manufactured and its intended use as one skilled in the art will appreciate. According to one embodiment, the scavenging compositions do not contain any of the additional agents or additives.

4. SYNTHETIC METHODS

The compounds and compositions of the invention can be better understood in connection with the following synthetic schemes and methods which illustrate a means by which the compounds can be prepared.

A scavenging compound or composition of the invention can be commercially available. Alternatively, a scavenging compound or composition of the invention can be prepared via one or more synthetic steps.

A scavenging compound or composition of the invention can be prepared by treating an olefin with an epoxidation reagent (e.g., meta-chloroperoxybenzoic acid). A scavenging compound or composition of the invention can be prepared by intramolecular cyclization of a halohydrin.

α-Functionalized epoxides of formula (5) can be prepared as described in Scheme 3, wherein $R^a$-$R^e$ are as defined above. Treatment of an alkene of formula (6) with a solution of hydrogen peroxide (7) (e.g., 5-70% $H_2O_2$ solution), preferably at 25-40° C. and for 1 to 24 hours, will provide an epoxide of formula (5).

Scheme 3

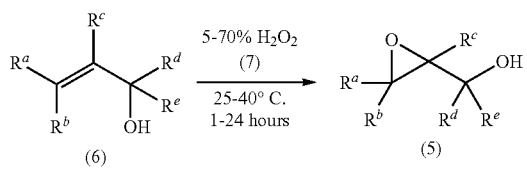

β-Functionalized epoxides of formula (8) can be prepared as described in Scheme 4, wherein $R^a$-$R^g$ are as defined above. Treatment of an alkene of formula (9) with a solution of hydrogen peroxide (7) (e.g., 5-70% $H_2O_2$ solution), preferably at 25-40° C. and for 1 to 24 hours, will provide an epoxide of formula (8).

Scheme 4

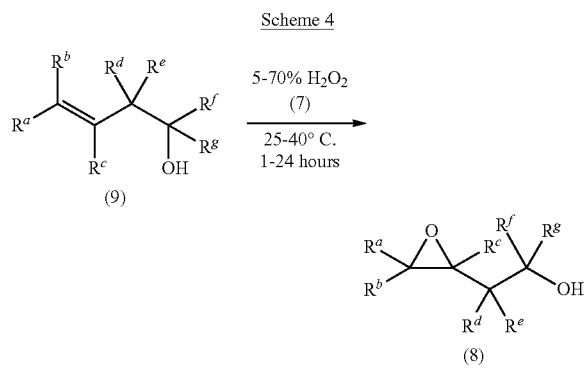

β-Functionalized epoxides of formula (10) can be prepared as described in Scheme 5, wherein $R^a$-$R^c$ are as defined above, $R^d$ and $R^f$ together with the carbon atoms to which they are attached form an aryl, and $R^e$ and $R^g$ are absent. Treatment of an alkene of formula (11) with a solution of hydrogen peroxide (7) (e.g., 5-70% $H_2O_2$ solution), preferably at 25-40° C. and for 1 to 24 hours, will provide an epoxide of formula (10).

Scheme 5

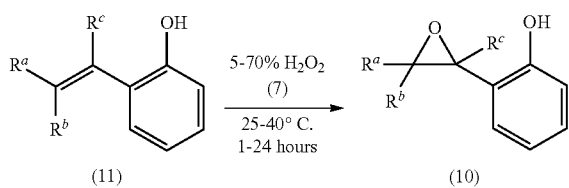

Compounds of the invention can be prepared from castor oil or a castor oil derivative (e.g., a glyceryl ricinoleate) through epoxidation with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. $H_2O_2$). The mixture is then allowed to react for 16 to 18 hours at 40° C. After the reaction, the mixture is washed twice with 5% $NaHCO_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous $Na_2SO_4$. Castor oil and its derivatives give clear viscous to slightly viscous products. FTIR and NMR analysis of the purified product confirms quantitative reaction of the carbon-carbon double bonds. The appearance of bands at 827 and 840 $cm^{-1}$ in FTIR spectra of the product supported by the appearance of new signals at 2.8 to 3.2 ppm in $^1H$ NMR confirms epoxidation of the double bonds.

The compounds can be further modified, for example, by manipulation of substituents. These manipulations can include, but are not limited to, reduction, oxidation, organometallic cross-coupling, alkylation, acylation, and hydrolysis reactions which are commonly known to those skilled in the art. In some cases, the order of carrying out the foregoing reaction schemes can be varied to facilitate the reaction or to avoid unwanted reaction products.

5. METHODS OF USE

The compounds and compositions of the invention can be used for sweetening a gas or liquid, such as a sour gas or a sour liquid. The compounds and compositions can be used for scavenging hydrogen sulfide and/or mercaptans from a gas or liquid stream by treating said stream with an effective amount of a compound or composition of the invention, as described herein. The compounds and compositions of the invention can be used in any industry where it is desirable to capture hydrogen sulfide and/or mercaptans from a gas or liquid stream.

The compounds and compositions can be used in water systems, condensate/oil systems/gas systems, or any combination thereof. The compounds and compositions can be applied to a gas or liquid produced or used in the production, transportation, storage, and/or separation of crude oil or natural gas. The compounds and compositions can be applied to a gas stream used or produced in a coal-fired process, such as a coal-fired power plant. The compounds and compositions can be applied to a gas or liquid produced or used in a waste-water process, a farm, a slaughter house, a land-fill, a municipality waste-water plant, a coking coal process, or a biofuel process.

The compounds and compositions can be added to any fluid or gas containing hydrogen sulfide and/or a mercaptan, or a fluid or gas that can be exposed to hydrogen sulfide and/or a mercaptan. A fluid to which the compounds and compositions can be introduced can be an aqueous medium. The aqueous medium can comprise water, gas, and optionally liquid hydrocarbon. A fluid to which the compounds and compositions can be introduced can be a liquid hydrocarbon. The liquid hydrocarbon can be any type of liquid hydrocarbon including, but not limited to, crude oil, heavy oil, processed residual oil, bituminous oil, coker oils, coker gas oils, fluid catalytic cracker feeds, gas oil, naphtha, fluid catalytic cracking slurry, diesel fuel, fuel oil, jet fuel, gasoline, and kerosene. The gas can be a sour gas. The fluid or gas can be a refined hydrocarbon product.

A fluid or gas treated with a compound or composition of the invention can be at any selected temperature, such as ambient temperature or an elevated temperature. The fluid (e.g., liquid hydrocarbon) or gas can be at a temperature of from about 40° C. to about 250° C. The fluid or gas can be at a temperature of from −50° C. to 300° C., 0° C. to 200° C., 10° C. to 100° C., or 20° C. to 90° C. The fluid or gas can be at a temperature of 22° C., 23° C., 24° C., 25° C., 26° C., 27° C., 28° C., 29° C., 30° C., 31° C., 32° C., 33° C., 34° C., 35° C., 36° C., 37° C., 38° C., 39° C., or 40° C. The fluid or gas can be at a temperature of 85° C., 86° C., 87° C., 88° C., 89° C., 90° C., 91° C., 92° C., 93° C., 94° C., 95° C., 96° C., 97° C., 98° C., 99° C., or 100° C.

The compounds and compositions of the invention can be added to a fluid at various levels of water cut. For example, the water cut can be from 0% to 100% volume/volume (v/v), from 1% to 80% v/v, or from 1% to 60% v/v. The fluid can be an aqueous medium that contains various levels of salinity. The fluid can have a salinity of 0% to 25%, about 1% to 24%, or about 10% to 25% weight/weight (w/w) total dissolved solids (TDS).

The fluid or gas in which the compounds and compositions of the invention are introduced can be contained in and/or exposed to many different types of apparatuses. For example, the fluid or gas can be contained in an apparatus that transports fluid or gas from one point to another, such as an oil and/or gas pipeline. The apparatus can be part of an oil and/or gas refinery, such as a pipeline, a separation vessel, a dehydration unit, or a gas line. The fluid can be contained in and/or exposed to an apparatus used in oil extraction and/or production, such as a wellhead. The apparatus can be part of a coal-fired power plant. The apparatus can be a scrubber (e.g., a wet flue gas desulfurizer, a spray dry absorber, a dry sorbent injector, a spray tower, a contact or bubble tower, or the like). The apparatus can be a cargo vessel, a storage vessel, a holding tank, or a pipeline connecting the tanks, vessels, or processing units. The fluid or gas can be contained in water systems, condensate/oil systems/gas systems, or any combination thereof.

The compounds or compositions of the invention can be introduced into a fluid or gas by any appropriate method for ensuring dispersal of the scavenger through the fluid or gas. The compounds and compositions can be injected using mechanical equipment such as chemical injection pumps, piping tees, injection fittings, atomizers, quills, and the like. The compounds and compositions of the invention can be introduced with or without one or more additional polar or non-polar solvents depending upon the application and requirements. The compounds and compositions of the invention can be pumped into an oil and/or gas pipeline using an umbilical line. Capillary injection systems can be used to deliver the compounds and compositions to a selected fluid. The compounds and compositions can be introduced into a liquid and mixed. The compounds and compositions can be injected into a gas stream as an aqueous or nonaqueous solution, mixture, or slurry. The fluid or gas can be passed through an absorption tower comprising a compound or composition of the invention.

The compounds and compositions can be applied to a fluid or gas to provide any selected scavenger concentration. The compounds and compositions can be applied to a fluid or gas to provide a scavenger concentration of about 1 parts per million (ppm) to about 1,000,000 ppm, about 1 parts per million (ppm) to about 100,000 ppm, about 10 ppm to about 75,000 ppm, about 100 ppm to about 45,000 ppm, about 500 ppm to about 40,000 ppm, about 1,000 ppm to about 35,000 ppm, about 3,000 ppm to about 30,000 ppm, about 4,000 ppm to about 25,000 ppm, about 5,000 ppm to about 20,000 ppm, about 6,000 ppm to about 15,000 ppm, or about 7,000 ppm to about 10,000 ppm. The compounds and compositions can be applied to a fluid at a concentration of about 100 ppm to about 10,000 ppm, about 200 ppm to about 8,000 ppm, or about 500 ppm to about 6,000 ppm. The compounds and compositions are applied to a fluid or gas to provide a scavenger concentration of 3,000 ppm or greater, 3,500 ppm or greater, 4,000 ppm or greater, 4,500 ppm or greater, or 5,000 ppm or greater. Each system can have its own requirements, and a more sour gas (e.g., containing more hydrogen sulfide) can require a higher dose rate of a compound or composition of the invention. The compounds and compositions can be applied to a fluid or gas in an equimolar amount or greater relative to hydrogen sulfide and/or mercaptans present in the fluid or gas. The compounds and compositions can be applied to a fluid or gas to provide a scavenger to hydrogen sulfide and/or mercaptans molar ratio of 1:1, 2:1, 3:1, 4:1, 5:1, 6:1, 7:1, 8:1, 9:1, or 10:1. The compounds and compositions can be applied to a fluid or gas as a neat composition (e.g., the compounds and compositions can be used neat in a contact tower).

The hydrogen sulfide and/or mercaptan in a fluid or gas can be reduced by any amount by treatment with a compound or composition of the invention. The actual amount of residual hydrogen sulfide and/or mercaptan after treatment can vary depending on the starting amount. The hydrogen sulfide and/or mercaptan levels can be reduced to about 150 ppm by volume or less, as measured in the vapor phase, based on the volume of the liquid media. The hydrogen sulfide levels and/or mercaptan can be reduced to 100 ppm by volume or less, as measured in the vapor phase, based on the volume of the liquid media. The hydrogen sulfide and/or mercaptan levels can be reduced to 50 ppm by volume or less, as measured in the vapor phase, based on the volume of the liquid media. The hydrogen sulfide and/or mercaptan levels can be reduced to 20 ppm by volume or less, as measured in the vapor phase, based on the volume of the liquid media. The hydrogen sulfide and/or mercaptan levels can be reduced to 15 ppm by volume or less, as measured in the vapor phase, based on the volume of the liquid media. The hydrogen sulfide and/or mercaptan levels can be reduced to 10 ppm by volume or less, as measured in the vapor phase, based on the volume of the liquid media. The hydrogen sulfide and/or mercaptan levels can be reduced to 5 ppm by volume or less, as measured in the vapor phase, based on the volume of the liquid media. The hydrogen sulfide and/or mercaptan levels can be reduced to 0 ppm by volume, as measured in the vapor phase, based on the volume of the liquid media.

The compounds, compositions, methods, and processes of the invention will be better understood by reference to the following examples, which are intended as an illustration of and not a limitation upon the scope of the invention.

6. EXAMPLES

The foregoing can be better understood by reference to the following examples, which are presented for purposes of illustration and are not intended to limit the scope of the invention.

Example 1

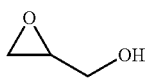 (i)

Example 1 can be prepared by epoxidation of allyl alcohol (e.g., with a 5-70% $H_2O_2$ solution at 25-40° C. for 1 to 24 hours).

Example 2

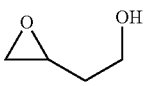 (ii)

Example 2 can be prepared by epoxidation of 1-buten-4-ol (e.g., with a 5-70% $H_2O_2$ solution at 25-40° C. for 1 to 24 hours).

Example 3

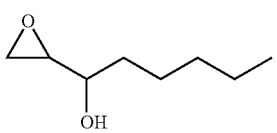 (iii)

Example 3 can be prepared by epoxidation of 1-octen-3-ol (e.g., with a 5-70% $H_2O_2$ solution at 25-40° C. for 1 to 24 hours).

Example 4

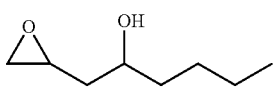 (iv)

Example 4 can be prepared by epoxidation of 1-octen-4-ol (e.g., with a 5-70% $H_2O_2$ solution at 25-40° C. for 1 to 24 hours).

Example 5

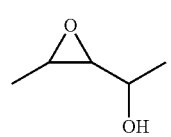 (v)

Example 5 can be prepared by epoxidation of 3-penten-2-ol (e.g., with a 5-70% $H_2O_2$ solution at 25-40° C. for 1 to 24 hours).

Example 6

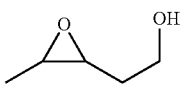 (vi)

Example 6 can be prepared by epoxidation of 3-penten-1-ol (e.g., with a 5-70% $H_2O_2$ solution at 25-40° C. for 1 to 24 hours).

Example 7

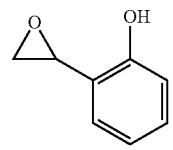 (vii)

Example 7 can be prepared by epoxidation of 2-vinyl-phenol (e.g., with a 5-70% $H_2O_2$ solution at 25-40° C. for 1 to 24 hours)

Example 8

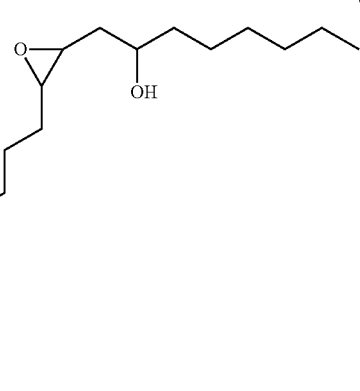 (viii)

Example 8 can be prepared by epoxidation of ricinoleic acid with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. $H_2O_2$). The mixture is then allowed to react for 16 to 18 hours at 40° C. After the reaction, the mixture is washed twice with 5% $NaHCO_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous Na$_2$SO$_4$. Castor oil and its derivatives give clear viscous to slightly viscous products. FTIR and NMR analysis of the purified product confirms quantitative reaction of the carbon-carbon double bond.

Example 9

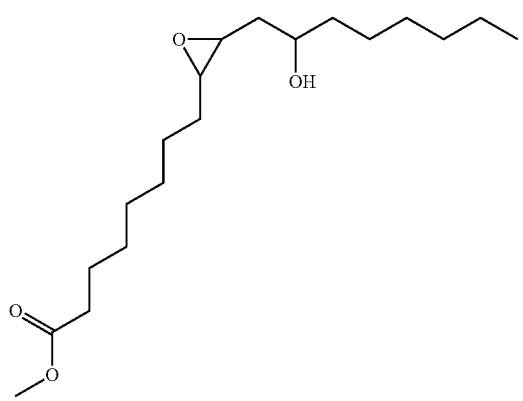

(ix)

Example 9 can be prepared by epoxidation of ricinoleic acid methyl ester with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. H$_2$O$_2$). The mixture is then allowed to react for 16 to 18 hours at 40° C. After the reaction, the mixture is washed twice with 5% NaHCO$_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous Na$_2$SO$_4$. Castor oil and its derivatives give clear viscous to slightly viscous products. FTIR and NMR analysis of the purified product confirms quantitative reaction of the carbon-carbon double bond.

Example 10

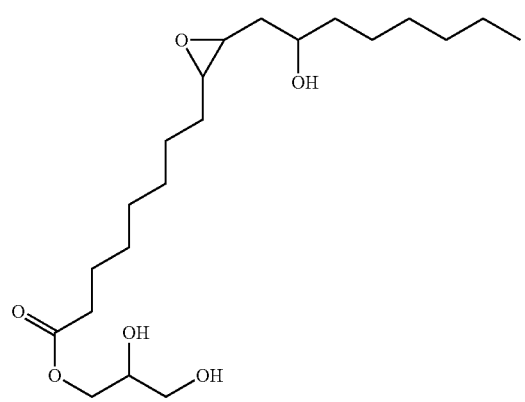

(x)

Example 10 can be prepared by epoxidation of a glyceryl monoricinoleate with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. H$_2$O$_2$). The mixture is then allowed to react for 16 to 18 hours at 40° C. After the reaction, the mixture is washed twice with 5% NaHCO$_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous Na$_2$SO$_4$. Castor oil and its derivatives give clear viscous to slightly viscous products. FTIR and NMR analysis of the purified product confirms quantitative reaction of the carbon-carbon double bond.

Example 11

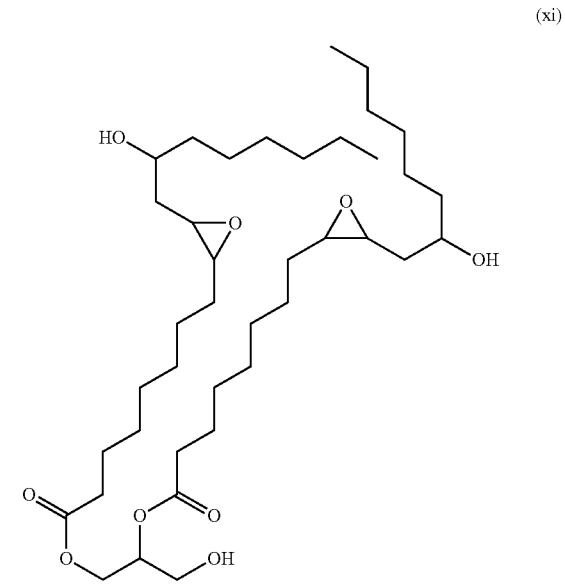 [SMILES: CCCCCCC(O)CC1OC1CCCCCCCC(=O)OCC(CO)OC(=O)CCCCCCCC1OC1CC(O)CCCCCC]

(xi)

Example 11 can be prepared by epoxidation of a glyceryl diricinoleate with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. H$_2$O$_2$). The mixture is then allowed to react for 16 to 18 hours at 40° C. After the reaction, the mixture is washed twice with 5% NaHCO$_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous Na$_2$SO$_4$. Castor oil and its derivatives give clear viscous to slightly viscous products. FTIR and NMR analysis of the purified product confirms quantitative reaction of the carbon-carbon double bonds. The appearance of bands at 827 and 840 cm$^{-1}$ in FTIR spectra of the product supported by the appearance of new signals at 2.8 to 3.2 ppm in $^1$H NMR confirms epoxidation of the double bonds.

Example 12

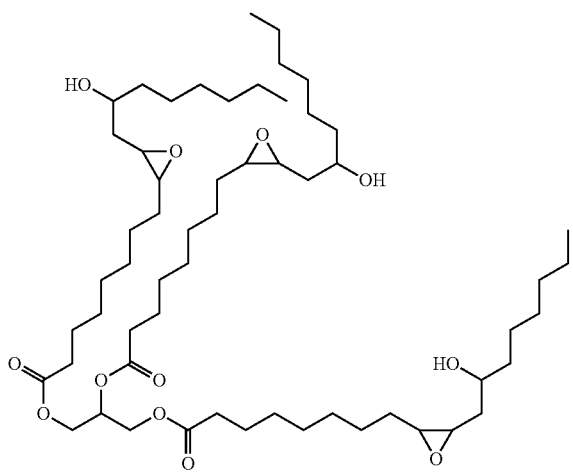

(xii)

Example 12 can be prepared by epoxidation of castor oil with performic acid generated in situ. In a typical synthesis, 0.5 equivalent of formic acid is added to 1 equivalent of the substrate in a round bottom flask. The mixture is heated to 40° C. with stirring followed by dropwise addition of 2 equivalents of hydrogen peroxide (30% aq. $H_2O_2$). The mixture is then allowed to react for 16 to 18 hours at 40° C. After the reaction, the mixture is washed twice with 5% $NaHCO_3$ solution. For viscous substrates, the product is further purified by vacuum distillation. Alternatively, for non-viscous substrates (e.g. castor oil methyl ester), further purification can be carried out by centrifugation to remove residual water followed by drying with anhydrous $Na_2SO_4$. Castor oil and its derivatives give clear viscous to slightly viscous products. FTIR and NMR analysis of the purified product confirms quantitative reaction of the carbon-carbon double bonds. The appearance of bands at 827 and 840 $cm^{-1}$ in FTIR spectra of the product supported by the appearance of new signals at 2.8 to 3.2 ppm in $^1H$ NMR confirms epoxidation of the double bonds.

Example 13

Hydrogen Sulfide/Mercaptan Scavenging Studies

FIG. 1 shows the dose response profile of glycidol when used to scavenge 1-propyl mercaptan from kerosene. The test was conducted using kerosene samples containing 1,000 ppm of 1-propyl mercaptan. The samples were dosed with different amounts of glycidol (0-5,000 ppm). Glycidol was added to each bottle followed by the kerosene containing the mercaptan. The amount of mercaptan in the vapor was measured using a 200 mL full 500 mL container using Draeger or Gastec Tubes to measure the amount of mercaptan in the vapor. The samples were vigorously shaken for 30 seconds and then set at room temperature for 18-24 hours. After 18-24 hours, the sample was shaken vigorously for 30 seconds and then tested with a Draeger or Gastec tube. FIG. 1 demonstrates that when a kerosene sample containing 1-propyl mercaptan sample is treated with a scavenger, glycidol, it is possible to decrease the vapor phase detectable mercaptan with increasing amounts of scavenger. Each bar in FIG. 1 corresponds to an individual test.

Table 1 shows the result of treating kerosene containing 1,000 ppm of propane thiol with 10,000 ppm of glycidol as the scavenger. Table 1 demonstrates that once a mercaptan sample is treated with glycidol it is possible for the fuel sample (in this case kerosene) to pass the major liquid phase tests for mercaptans including ASTM D-4952, UOP-163, and ASTM D-3227. A result of <1 ppm for UOP 163 or <3 ppm for D-3227 indicates that the mercaptan level was below the limit of detection for the test.

TABLE 1

| Mercaptan Test | Result |
|---|---|
| D-4952 | Neg/Sweet |
| UOP-163 | <1 ppm |
| D3227 | <3 ppm |

Figure 2:
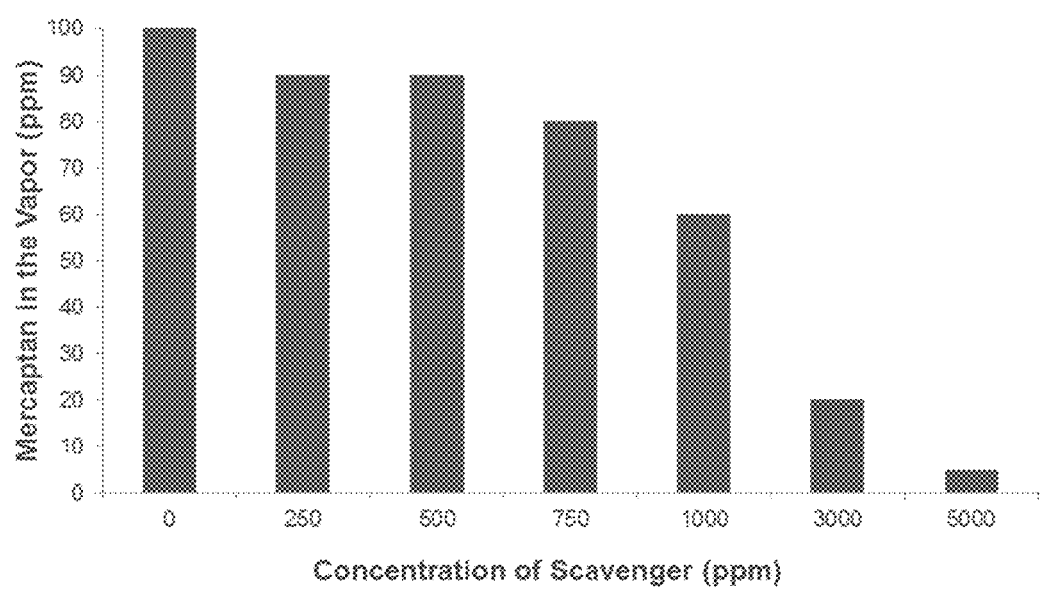
FIG. 2 depicts scavenging of 1-propyl mercaptan, 2-propyl mercaptan, butyl mercaptan, benzyl thiol, and ethanol thiol using 3-hydroxypropylene oxide.

FIG. 2 shows the dose response profile of glycidol when used to scavenge a 1,000 ppm mixture of mercaptans (22% 1-propyl mercaptan, 22% 2-propyl mercaptan, 43% butyl mercaptan, 11% benzyl thiol, 2% ethane thiol) in kerosene at 22° C. The amount of mercaptan in the vapor was measured using a 200 mL full 500 mL container using Draeger or Gastec Tubes to measure the amount of mercaptan in the vapor. Glycidol was added to the bottle followed by the kerosene containing the mercaptan. The samples were vigorously shaken for 30 seconds and then set at room temperature for 18-24 hours. After 18-24 hours, the sample was shaken vigorously for 30 seconds and then tested with a Draeger or Gastec tube. Each bar in FIG. 2 corresponds to an individual test. FIG. 2 demonstrates that a variety of mercaptan compounds can be treated using glycidol.

Figure 3:
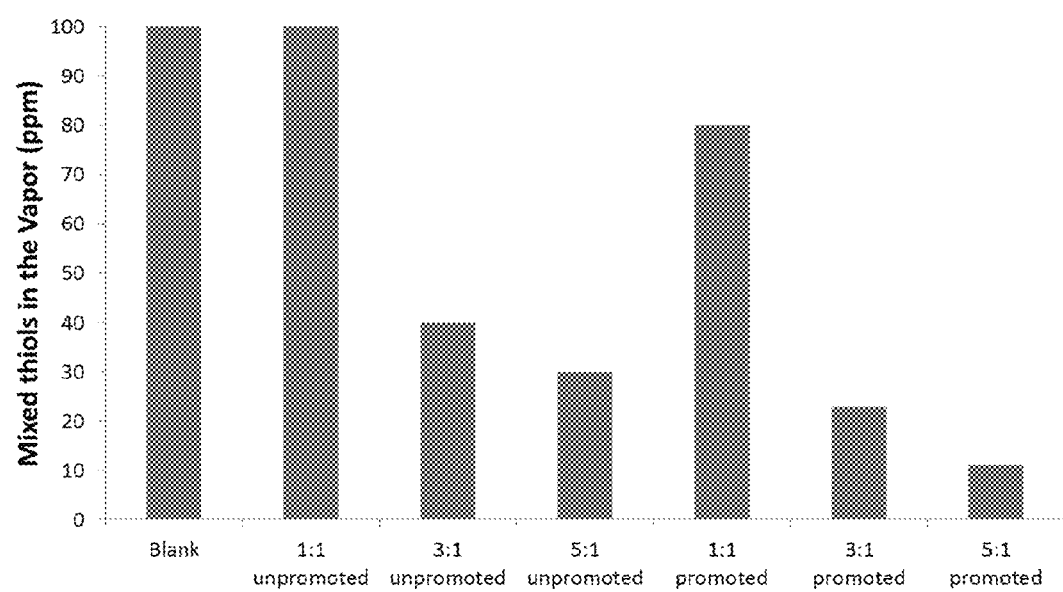
FIG. 3 depicts scavenging of 1-propyl mercaptan, 2-propyl mercaptan, butyl mercaptan, benzyl thiol, and ethanol thiol using 3-hydroxypropylene oxide in the absence or presence of a surfactant.

FIG. 3 shows the dose response profile of glycidol when used to scavenge a 1,000 ppm mixture of mercaptans (22% 1-propyl mercaptan, 22% 2-propyl mercaptan, 43% butyl mercaptan, 11% benzyl thiol, 2% ethane thiol) in kerosene at 22° C. The scavenger was evaluated at a ratio of 1 equivalent scavenger to 1 equivalent mercaptan ("1:1"); 3 equivalents scavenger to 1 equivalent mercaptan ("3:1"); and 5 equivalents scavenger to 1 equivalent mercaptan ("5:1"). The scavenger was evaluated in the absence of 3% cocodimethylamine oxide surfactant ("unpromoted"), and in the presence of 3% cocodimethylamine oxide surfactant ("promoted"). The results indicate that scavenger:mercaptan ratios of 3:1 and 5:1 effectively removes mercaptan species from the kerosene, even in the absence of the cocodimethylamine oxide promoter. The results also indicate that formulations with a surfactant (e.g., cocodimethylamine oxide) have improved efficacy over unpromoted formulations.

The scavenger formulations of the foregoing experiments were prepared with 50 wt % glycidol, 0-20 wt % cocodimethylamine oxide, and the remaining percentage was methyl carbitol as the solvent.

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. Any and all patents, patent applications, scientific papers, and other references cited in this application, as well as any references cited therein, are hereby incorporated by reference in their entirety.

What is claimed is:

1. A method of sweetening a fluid or gas, comprising treating the fluid or gas with an effective amount of a composition comprising one or more compounds of formula (I),

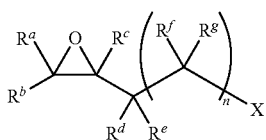

wherein,
X is selected from the group consisting of —OH, —SH, and —NHR$^3$;
R$^3$ is selected from the group consisting of hydrogen, alkyl, alkenyl, alkynyl, aryl, heteroaryl, heterocycle, cycloalkyl, and —C(O)R$^7$;
R$^7$ is selected from the group consisting of —OR$^{15}$, —SR$^{16}$, —NR$^{17}$R$^{18}$, hydrogen, alkyl, alkenyl, alkynyl, aryl, heteroaryl, heterocycle, and cycloalkyl;
R$^{15}$, R$^{16}$, R$^{17}$, and R$^{18}$ are each independently selected from the group consisting of hydrogen, alkyl, alkenyl, alkynyl, aryl, heteroaryl, heterocycle, and cycloalkyl;
R$^a$, R$^b$, R$^c$, R$^d$, R$^e$, R$^f$, and R$^g$ are each independently selected from the group consisting of hydrogen, halogen, alkyl, alkenyl, alkynyl, aryl, heteroaryl, heterocycle, and cycloalkyl; or R$^d$ and R$^f$ together with the carbon atoms to which they are attached form an aryl or a heteroaryl, provided that R$^e$ and R$^g$ are absent, R$^a$, R$^b$, and R$^c$ are each independently selected from the group consisting of hydrogen, halogen, alkyl, alkenyl, alkynyl, aryl, heteroaryl, heterocycle, and cycloalkyl when R$^d$ and R$^f$ together with the carbon atoms to which they are attached form an aryl or a heteroaryl; and
n is 0 or 1;
wherein said alkyl, alkenyl, alkynyl, aryl, heteroaryl, heterocycle, and cycloalkyl are each independently, at each occurrence, substituted or unsubstituted with one or more suitable substituents.

2. The method of claim 1, wherein X is —OH.

3. The method of claim 2, wherein R$^a$, R$^b$, R$^c$, R$^d$, R$^e$, R$^f$ and R$^g$ are each independently selected from the group consisting of hydrogen, substituted or unsubstituted C$_1$-C$_{10}$-alkyl, fluoro, bromo, and iodo.

4. The method of claim 1, wherein X is —OH; R$^a$ is hydrogen or substituted or unsubstituted alkyl; R$^b$ is hydrogen; R$^c$ is hydrogen; R$^d$ is hydrogen or substituted or unsubstituted alkyl; R$^e$ is hydrogen; and n is 0.

5. The method of claim 1, wherein X is —OH; R$^a$ is hydrogen or unsubstituted C$_1$-C$_{10}$-alkyl; R$^b$ is hydrogen; R$^c$ is hydrogen; R$^d$ is hydrogen or unsubstituted C$_1$-C$_{10}$-alkyl; R$^e$ is hydrogen; and n is 0.

6. The method of claim 1, wherein X is —OH; R$^a$ is hydrogen or substituted or unsubstituted alkyl; R$^b$ is hydrogen; R$^c$ is hydrogen; R$^d$ is hydrogen; R$^e$ is hydrogen; R$^f$ is hydrogen or substituted or unsubstituted alkyl; R$^g$ is hydrogen; and n is 1.

7. The method of claim 1, wherein X is —OH; R$^a$ is hydrogen or unsubstituted C$_1$-C$_{10}$-alkyl; R$^b$ is hydrogen; R$^c$ is hydrogen; R$^d$ is hydrogen; R$^e$ is hydrogen; R$^f$ is hydrogen or unsubstituted C$_1$-C$_{10}$-alkyl; R$^g$ is hydrogen; and n is 1.

8. The method of claim 1, wherein R$^a$, R$^b$, and R$^c$ are each independently selected from the group consisting of hydrogen, alkyl, alkenyl, alkynyl, aryl, heteroaryl, heterocycle, and cycloalkyl; R$^d$ and R$^f$ together with the carbon atoms to which they are attached form an aryl group; R$^e$ is absent; R$^g$ is absent; and n is 1.

9. The method of claim 1, wherein X is —OH; R$^a$ is hydrogen; R$^b$ is hydrogen; R$^c$ is hydrogen; R$^d$ and R$^f$ together with the carbon atoms to which they are attached form a phenyl group, optionally having one to four suitable substituents in addition to the —OH; R$^e$ is absent; R$^g$ is absent; and n is 1.

10. The method of claim 1, wherein X is —OH; R$^a$ is —(CH$_2$)$_7$—C(O)OR$^x$, wherein R$^x$ is selected from the group consisting of hydrogen, alkyl, alkenyl, alkynyl, aryl, heteroaryl, heterocycle, and cycloalkyl, wherein said alkyl, alkenyl, alkynyl, aryl, heteroaryl, heterocycle, and cycloalkyl are each independently, at each occurrence, substituted or unsubstituted with one or more suitable substituents; R$^b$ is hydrogen; R$^c$ is hydrogen; R$^d$ is hydrogen; R$^e$ is hydrogen; R$^f$ is —(CH$_2$)$_5$CH$_3$; R$^g$ is hydrogen; and n is 1.

11. The method of claim 1, wherein X is —OH; R$^a$ is —(CH$_2$)$_7$—C(O)OR$^x$, wherein R$^x$ is

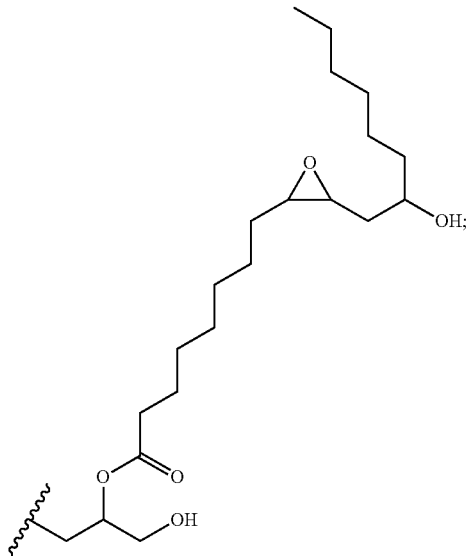 [SMILES: *CC(CO)OC(=O)CCCCCCCC1OC1CC(O)CCCCCC]

R$^b$ is hydrogen; R$^c$ is hydrogen; R$^d$ is hydrogen; R$^e$ is hydrogen; R$^f$ is —(CH$_2$)$_5$CH$_3$; R$^g$ is hydrogen; and n is 1.

12. The method of claim 1, X is —OH; $R^a$ is —$(CH_2)_7$—C(O)OR$^x$, wherein R$^x$ is
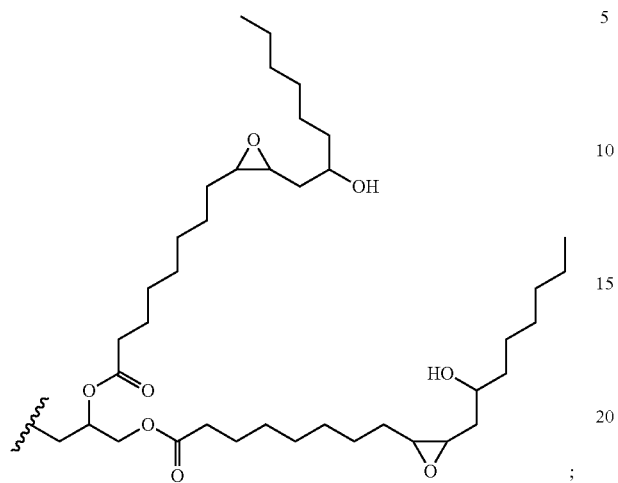
$R^b$ is hydrogen; $R^c$ is hydrogen; $R^d$ is hydrogen; $R^e$ is hydrogen; $R^f$ is —$(CH_2)_5CH_3$; $R^g$ is hydrogen; and n is 1.
13. The method of claim 1, wherein the compound of formula (I) is selected from the group consisting of:
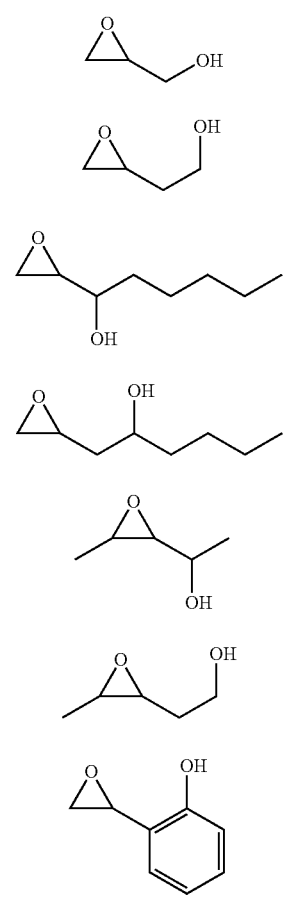
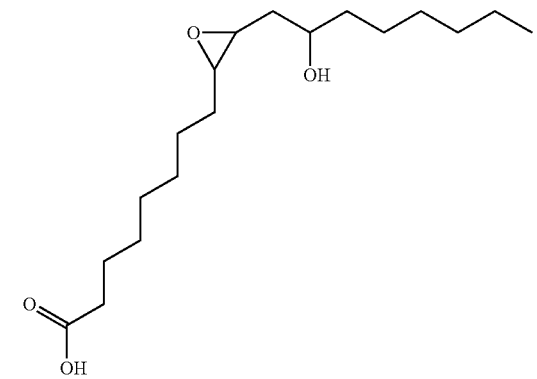
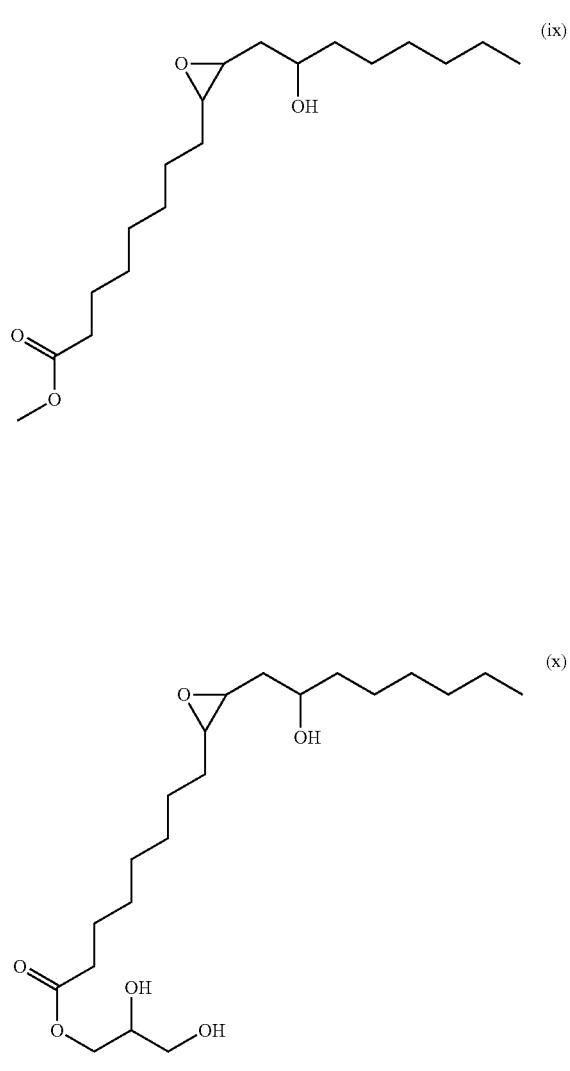

-continued (xi)

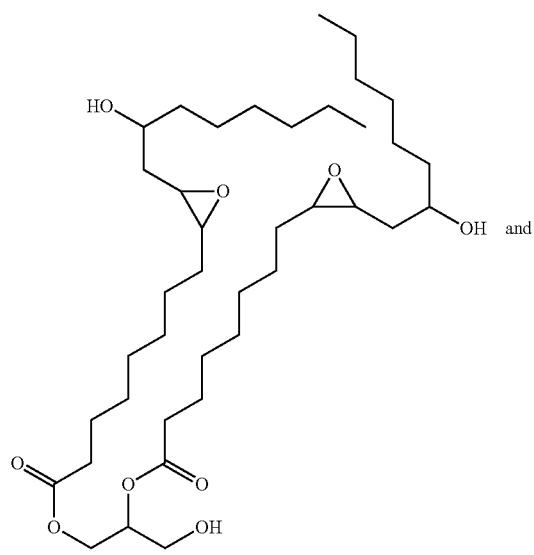

(xii)

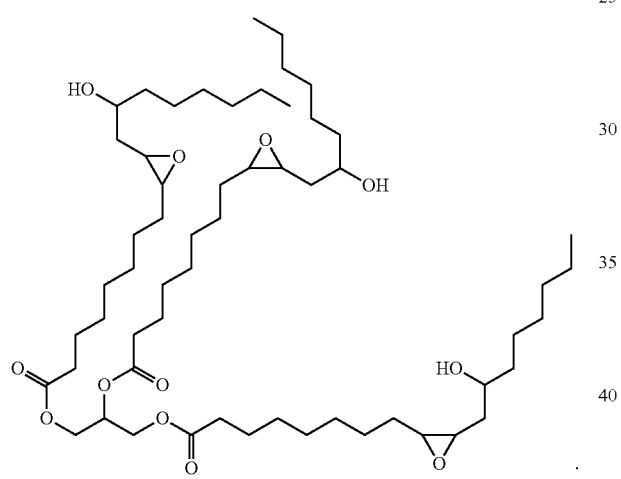

14. The method of claim 1, wherein the composition comprises a surfactant.

15. The method of claim 1, wherein the composition comprises a cocodimethylamine oxide surfactant.

16. The method of claim 1, wherein the composition scavenges hydrogen sulfide and/or mercaptans from the fluid or gas.

17. The method of claim 1, wherein the fluid or gas is produced or used in the production, transportation, storage, and/or separation of crude oil or natural gas.

18. The method of claim 1, wherein the fluid or gas is produced or used in a coal-fired process, a waste-water process, a farm, a slaughter house, a land-fill, a municipality waste-water plant, a coking coal process, or a biofuel process.

19. A method of sweetening a fluid or gas, comprising treating the fluid or gas with an effective amount of a composition comprising one or more compounds of formula (II),

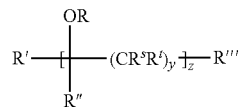 (II)

wherein

R is independently, at each occurrence, selected from the group consisting of hydrogen and a moiety comprising an α- or β-functionalized epoxide, said α- or β-functionalization selected from the group consisting of —OH, —SH, and —NHR$^{23}$, wherein at least one R group is a moiety comprising said α- or β-functionalized epoxide;

$R^{23}$ is selected from the group consisting of hydrogen, alkyl, alkenyl, alkynyl, aryl, heteroaryl, heterocycle, cycloalkyl, and —C(O)R$^{27}$;

$R^{27}$ is selected from the group consisting of —OR$^{35}$, —SR$^{36}$, —NR$^{37}$R$^{38}$, hydrogen, alkyl, alkenyl, alkynyl, aryl, heteroaryl, heterocycle, and cycloalkyl;

$R^{35}$, $R^{36}$, $R^{37}$, and $R^{38}$ are each independently selected from the group consisting of hydrogen, alkyl, alkenyl, alkynyl, aryl, heteroaryl, heterocycle, and cycloalkyl;

R″, R$^s$, and R$^t$ are each independently, at each occurrence, selected from the group consisting of hydrogen, halogen, alkyl, alkenyl, alkynyl, aryl, heteroaryl, heterocycle, and cycloalkyl;

R′ and R‴ are each independently selected from the group consisting of hydrogen, halogen, alkyl, alkenyl, alkynyl, aryl, heteroaryl, heterocycle, and cycloalkyl;

y is independently, at each occurrence, an integer selected from 0 to 6; and z is an integer selected from 1 to 20;

wherein said alkyl, alkenyl, alkynyl, aryl, heteroaryl, heterocycle, and cycloalkyl are each independently, at each occurrence, substituted or unsubstituted with one or more suitable substituents.

20. The method of claim 19, wherein R is independently, at each occurrence, selected from the group consisting of hydrogen and a moiety of formula (III):

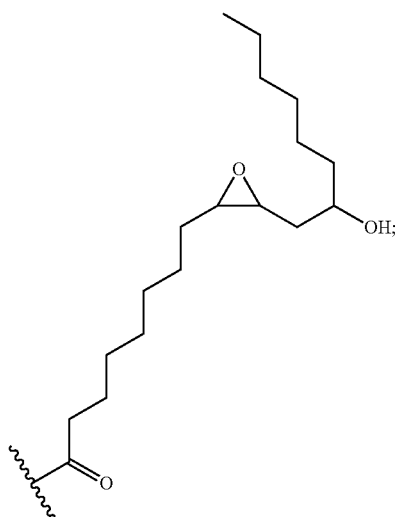 (III)

R', R'', and R''' are each hydrogen;
y is 0 at each occurrence; and
z is 3,
wherein at least one R group is said moiety of formula (III).

* * * * *

UNITED STATES PATENT AND TRADEMARK OFFICE
CERTIFICATE OF CORRECTION

PATENT NO. : 9,719,030 B2
APPLICATION NO. : 14/314683
DATED : August 1, 2017
INVENTOR(S) : Jennifer L. Sorrells and Nestor U. Soriano, Jr.

It is certified that error appears in the above-identified patent and that said Letters Patent is hereby corrected as shown below:

In the Claims

On Column 37, Claim 4, Line 62:
"$R^e$ is hydrogen;"
Should read:
"$R^c$ is hydrogen;"

On Column 37, Claim 5, Lines 65-66:
"$R^e$ is hydrogen;"
Should read:
"$R^c$ is hydrogen;"

On Column 38, Claim 6, Line 3:
"$R^e$ is hydrogen; $R^d$ is hydrogen;"
Should read:
"$R^c$ is hydrogen; $R^d$ is hydrogen;"

On Column 38, Claim 7, Lines 7-8:
"$R^e$ is hydrogen; $R^d$ is hydrogen;"
Should read:
"$R^c$ is hydrogen; $R^d$ is hydrogen;"

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*